(12) United States Patent
Hermiz et al.

(10) Patent No.: US 10,966,456 B1
(45) Date of Patent: Apr. 6, 2021

(54) CARTRIDGE FOR AN ELECTRONIC SMOKING DEVICE

(71) Applicant: Cegnum LLC, Farmington Hills, MI (US)

(72) Inventors: Randy Hermiz, Farmington Hills, MI (US); Nianzhong Li, Qingtangpu Town (CN)

(73) Assignee: Cegnum LLC, Farmington Hills, MI (US)

( * ) Notice: Subject to any disclaimer, the term of this patent is extended or adjusted under 35 U.S.C. 154(b) by 0 days.

(21) Appl. No.: 17/078,324

(22) Filed: Oct. 23, 2020

Related U.S. Application Data

(63) Continuation of application No. 16/872,516, filed on May 12, 2020, now Pat. No. 10,842,189, which is a continuation-in-part of application No. 16/677,123, filed on Nov. 7, 2019, now Pat. No. 10,743,589, which is a continuation of application No. 16/597,254, filed on Oct. 9, 2019, now Pat. No. 10,721,973.

(51) Int. Cl.
| | |
|---|---|
| *A24F 13/00* | (2006.01) |
| *A24F 40/42* | (2020.01) |
| *H05B 3/06* | (2006.01) |
| *G08B 5/22* | (2006.01) |
| *G05B 15/02* | (2006.01) |
| *H02J 7/00* | (2006.01) |
| *G06F 3/023* | (2006.01) |

(52) U.S. Cl.
CPC .............. *A24F 40/42* (2020.01); *G05B 15/02* (2013.01); *G08B 5/22* (2013.01); *H05B 3/06* (2013.01); *G06F 3/023* (2013.01); *H02J 7/0044* (2013.01); *H05B 2203/021* (2013.01)

(58) Field of Classification Search
CPC ................................. A24F 47/00; A24F 40/30
USPC .................................................. 131/328–329
See application file for complete search history.

(56) References Cited

U.S. PATENT DOCUMENTS

2017/0319799 A1* 11/2017 Yamada .................. A24F 40/40
2020/0359684 A1* 11/2020 Bruton .................. A24F 47/008

* cited by examiner

*Primary Examiner* — Phuong K Dinh
(74) *Attorney, Agent, or Firm* — Howard & Howard Attorneys PLLC

(57) ABSTRACT

A cartridge for an electronic smoking device. A housing includes a first reservoir configured to store a first liquid vaporizable material, a second reservoir configured to store a second liquid vaporizable material. A first and/or a second heating element is configured to be selectively heated by electrically energizing one or both of a first and/or a second terminal, respectively, so as to selectively produce an inhalable vapor of single flavor or of a blend of flavors. A base member between the first and second terminals may be electrically engaged by a capital assembly. The base member may define a first and second air aperture in fluid communication with the first and second heating elements, respectively. A third and a fourth terminal may be in electrical communication with the first and heating elements, respectively. The base member maybe configured to electrically energize the third and the fourth terminals.

20 Claims, 17 Drawing Sheets

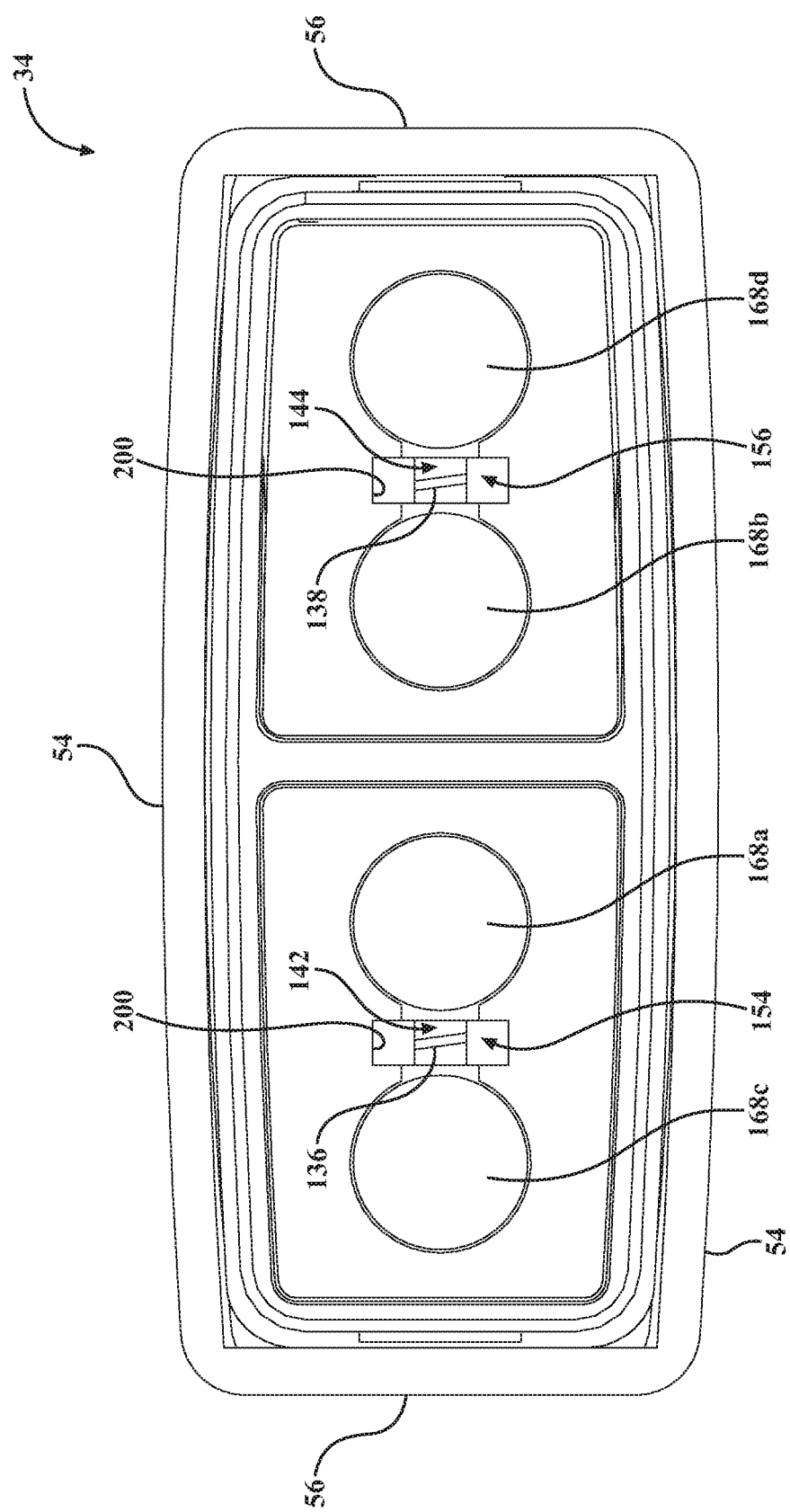

CARTRIDGE FOR AN ELECTRONIC SMOKING DEVICE

PRIORITY CLAIM

This is a continuation of copending U.S. application Ser. No. 16/872,516, filed May 12, 2020, which is a continuation-in-part of U.S. application Ser. No. 16/677,123, filed Nov. 7, 2019, now U.S. Pat. No. 10,743,589, which is a continuation of U.S. application Ser. No. 16/597,254, filed Oct. 9, 2019, now U.S. Pat. No. 10,721,973, the entire contents of each are hereby incorporated by reference.

BACKGROUND

The electronic cigarette—often referred as an e-cigarette, electronic smoking device, or electronic vaporing device—is a battery-powered device which simulates tobacco smoking. An atomizer may include a heating element that vaporizes a liquid solution (e-liquid) including, for example, nicotine, flavoring, or a combination thereof. The electronic smoking device may include a cartridge that contains the e-liquid, the heating element, and other components. The cartridge may be removably coupled to a base that houses several components of the electronic smoking device. The cartridge may be disposable, whereas the base may be reusable.

The electronic smoking device may include more than one atomizer to selectively vaporize one or more e-liquids, such that those disclosed in U.S. Pat. No. 9,271,528, issued Mar. 1, 2016, and U.S. Pat. No. 10,039,320, issued Aug. 7, 2018, the entire contents of each are hereby incorporated by reference. The '320 patent, for example, mentions a vapor blend recipe produced by vaporizing more than one flavored e-liquid. The devices lack an intuitive and efficient manner by which to select which one or more of the e-liquids to be vaporized, and/or to indicate to the user which one or more of the e-liquids is being vaporized during operation of the electronic smoking device.

Perhaps one appealing aspect of certain electronic smoking devices is the small form factor which may be easily stored and/or concealed. Providing an electronic smoking device including a cartridge for storing and selectively vaporizing more than one separately stored e-liquids in a space-conscious manner is a challenge not sufficiently addressed by known electronic smoking devices. Therefore, an electronic smoking device configured to overcome one or more of the aforementioned shortcomings is desired.

SUMMARY

A cartridge for an electronic smoking device. The cartridge includes a mouthpiece defining an opening at a proximal end of the cartridge. A housing coupled to the mouthpiece and includes a first reservoir configured to store a first liquid vaporizable material, and a second reservoir configured to store a second liquid vaporizable material. A base member is coupled to the housing. The base member defines a first aperture and a second aperture separated from the first aperture by a contact surface of the base member that is configured to engage a first pin of the capital assembly when the cartridge is removably coupled with the capital assembly. A first terminal is electrically insulated from the contact surface. The first terminal is configured to engage a second pin of the capital assembly when the cartridge is removably coupled with the capital assembly. A second terminal is electrically insulated from the contact surface. The second terminal configured to engage a third pin of the capital assembly when the cartridge is removably coupled with the capital assembly. A first heating element includes an end coupled to the first terminal and an opposing end in electrical communication with the contact surface. A second heating element including an end coupled to the second terminal and an opposing end in electrical communication with the contact surface such that the contact surface is a common terminal to both of the first and second heating elements. One or both of the first and second terminals are configured to be selectively electrically energized along with the contact surface so as to provide two electrical pathways for selectively operating one or both of the first and second heating elements.

A cartridge for an electronic smoking device. The cartridge includes a mouthpiece defining an opening at a proximal end of the cartridge. A housing coupled to the mouthpiece and includes a first reservoir configured to store a first liquid vaporizable material, and a second reservoir configured to store a second liquid vaporizable material. A base member is coupled to the housing and includes a contact surface configured to engage a pin of the capital assembly when the cartridge is removably coupled with the capital assembly. A first pair of terminals is configured to engage additional, respective pins of the capital assembly when the cartridge is removably coupled with the capital assembly. A second pair of terminals in electrical communication with the contact surface of the base member. First and second heating elements each including an end coupled to one of the first pair of terminals and one of the second pair of terminals. The first and second pairs of terminals are configured to be selectively electrically energized for selectively operating the cartridge in one of plural modes selected from the group consisting of: (i) a first mode in which the first heating element vaporizes the first liquid vaporizable material; (ii) a second mode in which the second heating element vaporizes the second liquid vaporizable material; and (iii) a third mode in which the first and second heating elements simultaneously vaporize the first and second liquid vaporizable material.

A cartridge for an electronic smoking device. The cartridge includes a mouthpiece defining an opening at a proximal end of the cartridge. A housing coupled to the mouthpiece and includes a first reservoir configured to store a first liquid vaporizable material, and a second reservoir configured to store a second liquid vaporizable material. A base member is coupled to the housing to define a distal end of the cartridge opposite the proximal end. The base member includes a contact surface configured to engage a pin of the capital assembly when the cartridge is removably coupled with the capital assembly. Terminals each include a contact surface positioned at least substantially flush with the contact surface. The terminals are configured to engage additional, respective pins of the capital assembly when the cartridge is coupled with the capital assembly. First and second heating elements each include an end coupled to a separate end of the terminals, and another end in electrical communication with the contact surface such that the contact surface is a common terminal to both of the first and second heating elements.

BRIEF DESCRIPTION OF THE DRAWINGS

Advantages of the present disclosure will be readily appreciated as the same becomes better understood by reference to the following detailed description when considered in connection with the accompanying drawings.

FIG. 17 is a bottom plan view of the cartridge of FIG. 13 with the base member removed.

DETAILED DESCRIPTION

Figure 1:
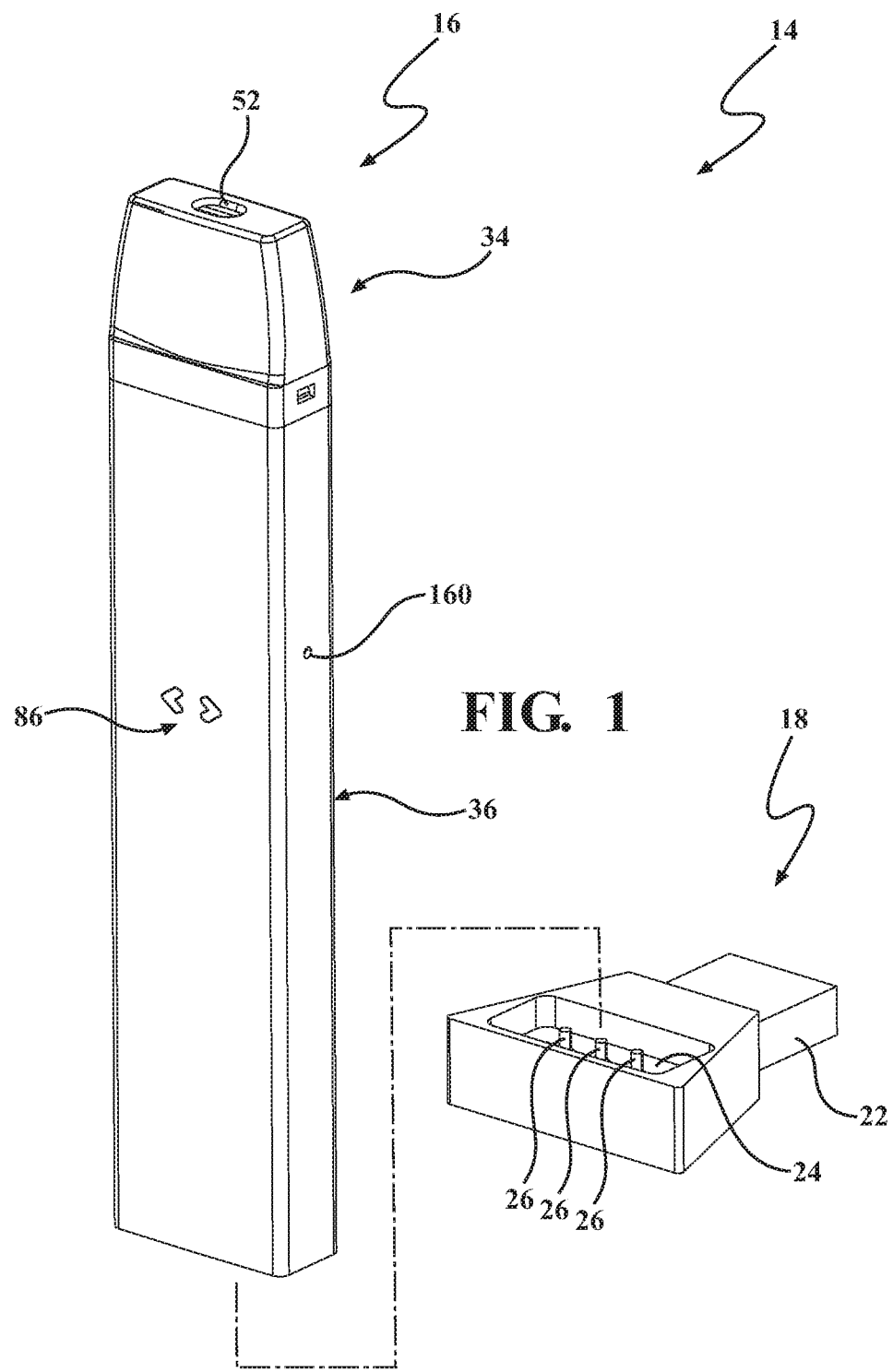
FIG. 1 is a perspective view of an electronic smoking system including an electronic smoking device and a base charger.

FIG. 1 shows an electronic smoking system 14 including an electronic smoking device 16 and a charger base 18. The electronic smoking device 16 is configured to be removably coupled to the charger base 18 as desired, for example, to replenish the energy stored within a power source 20 or battery (see FIGS. 4-6). More particularly, the charger base 18 may include a plug 22 configured to be removably coupled with a remote power source such as a wall outlet, personal device, or the like. The plug 22 shown in FIG. 1 is the male connector of a universal serial bus (USB) connection. The charger base 18 includes a recess 24 sized to accommodate and support the electronic smoking device 16 in an upright position, and magnets may be provided to further ensure adequate electrical connection. Terminals 26 may be disposed within the recess 24 and configured to engage complementary terminals of a charge printed circuit board (PCB) 28 (see FIGS. 5 and 6) when the electronic smoking device 16 is supported by the charger base 18.

Figure 2:
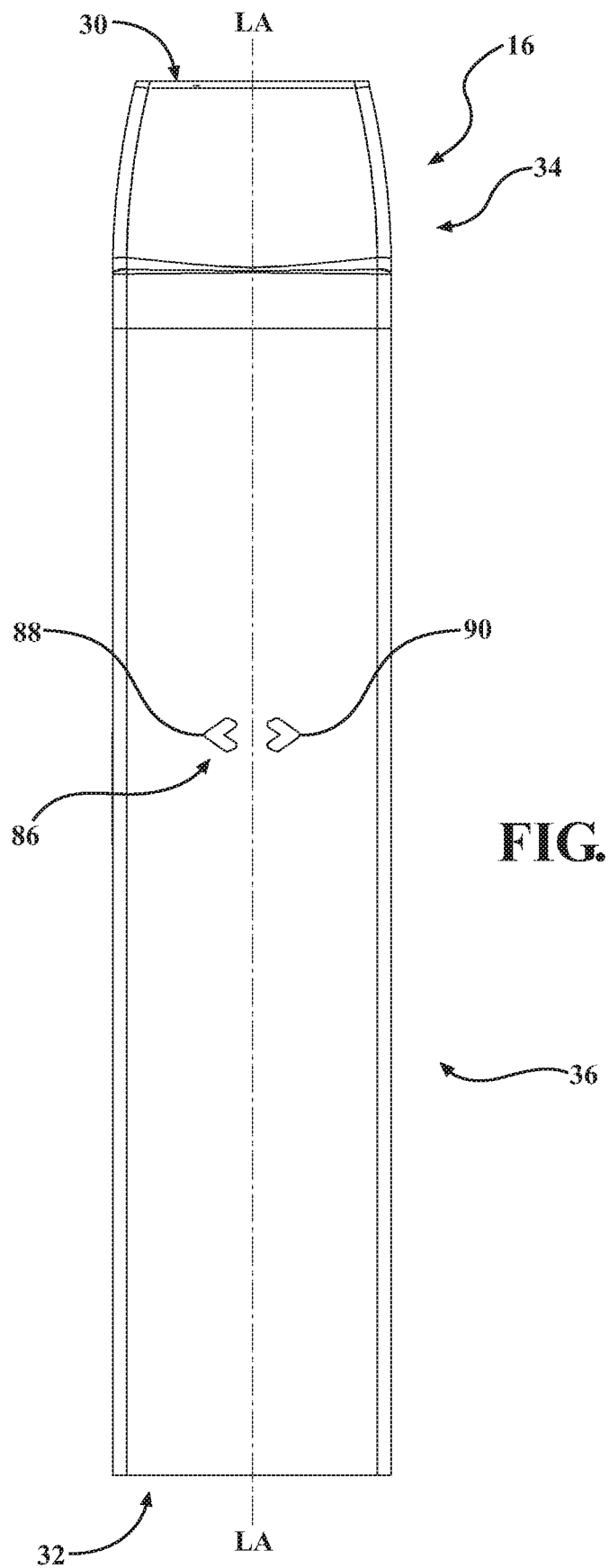
FIG. 2 is a front elevation view of the electronic smoking device.
Figure 3:
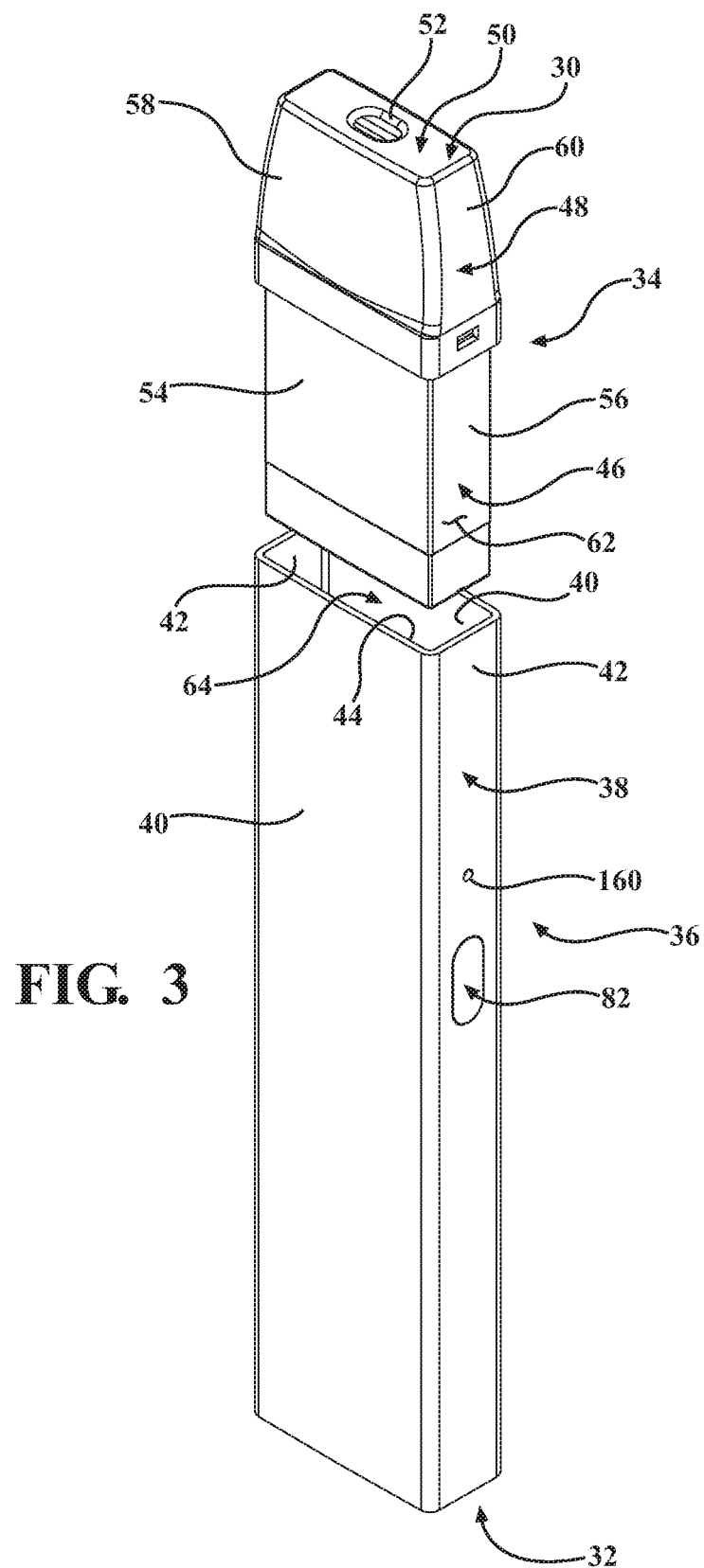
FIG. 3 is a rear perspective view of the electronic smoking device including a cartridge decoupled from a capital assembly.

With further reference to FIGS. 2 and 3, the electronic smoking device 16 includes a proximal end 30, and a distal end 32 opposite the proximal end 30. A length of the electronic smoking device 16 may be defined between the proximal and distal ends 30, 32 that may further define central or longitudinal axis (LA). The length of the electronic smoking device 16 may be greater than a width and greater than a thickness such that the electronic smoking device 16 is elongate in shape and/or non-circular in axial section.

The electronic smoking device 16 includes a cartridge 34 and a capital assembly 36. As implied by their names, the cartridge 34 may be removably coupled the capital assembly 36 and disposable and replaceable, whereas the capital assembly 36 may include components considered to be durable that may not need to be disposed of and replaced. However, it is contemplated that the electronic smoking device 16 may be of unitary construction and disposable.

The capital assembly 36 includes a casing 38. The casing 38 may be elongate and include a first pair of opposing sidewalls 40 and a second pair of opposing sidewalls 42. The first sidewalls 40 may define the width of the electronic smoking device 16, and the second sidewalls 42 may define the thickness of the electronic smoking device 16. The width may be greater than the thickness such that, with the first and second sidewalls 40, 42 arranged generally perpendicular to one another, the casing 38 is rectangular in section and defines a rectangular-shaped opening 44 of the capital assembly 36. In other words, the casing 38 as well as the electronic smoking device 16 may be non-circular in axial section. The capital assembly 36 may define the distal end 32 of the electronic smoking device 16.

The cartridge 34 includes a housing 46, and a mouthpiece 48 fixedly or removably coupled to the housing 46. The mouthpiece 48 may define a proximal end 50 of the cartridge 34, and the proximal end 30 of the electronic smoking device 16. Further, the mouthpiece 48 may define an opening 52 to facilitate a user drawing vapor through the electronic smoking device 16 in a manner to be further described. The mouthpiece 48 may be coupled to the housing 46 through an interference engagement, as shown in FIG. 3, or other suitable joining means. Each of the housing 46 and the mouthpiece 48 may be non-circular in axial section. The housing 46 may include a first pair of opposing sidewalls 54 and a second pair of opposing sidewalls 56. The first sidewalls 54 may define the width of the housing 46, and the second sidewalls 56 may define the thickness of the housing 46. The width may be greater than the thickness such that, with the first and second sidewalls 54, 56 arranged generally perpendicular to one another, the housing 46 is rectangular in section and sized to be snugly and slidably inserted into the rectangular-shaped opening 44 of the capital assembly 36. The mouthpiece 48 may also include a first pair of opposing sidewalls 58 and a second pair of opposing sidewalls 60. The first sidewalls 58 may define the width of the mouthpiece 48, and the second sidewalls 60 may define the thickness of the mouthpiece 48. The width and thickness of the mouthpiece 48 may be slightly greater than the width and thickness of the housing 46, respectively, such that a lip 63 extends around an outer periphery defined by outer surfaces 62 of the sidewalls 58, 60. The lip 63 may engage the rectangular-shaped opening 44 when the cartridge 34 is appropriately disposed within the capital assembly 36 such that the lip 63 provides a depth stop. The sidewalls 58, 60 of the mouthpiece 48 may taper inwardly in the proximal direction to the proximal end 50 to provide comfortable dimensions to the mouthpiece 48 over which the user places his or her mouth. The opening 52 is shown as a singular, oval-shaped opening, however, different quantities, shapes, and configurations of the opening(s) are contemplated.

Figure 4:
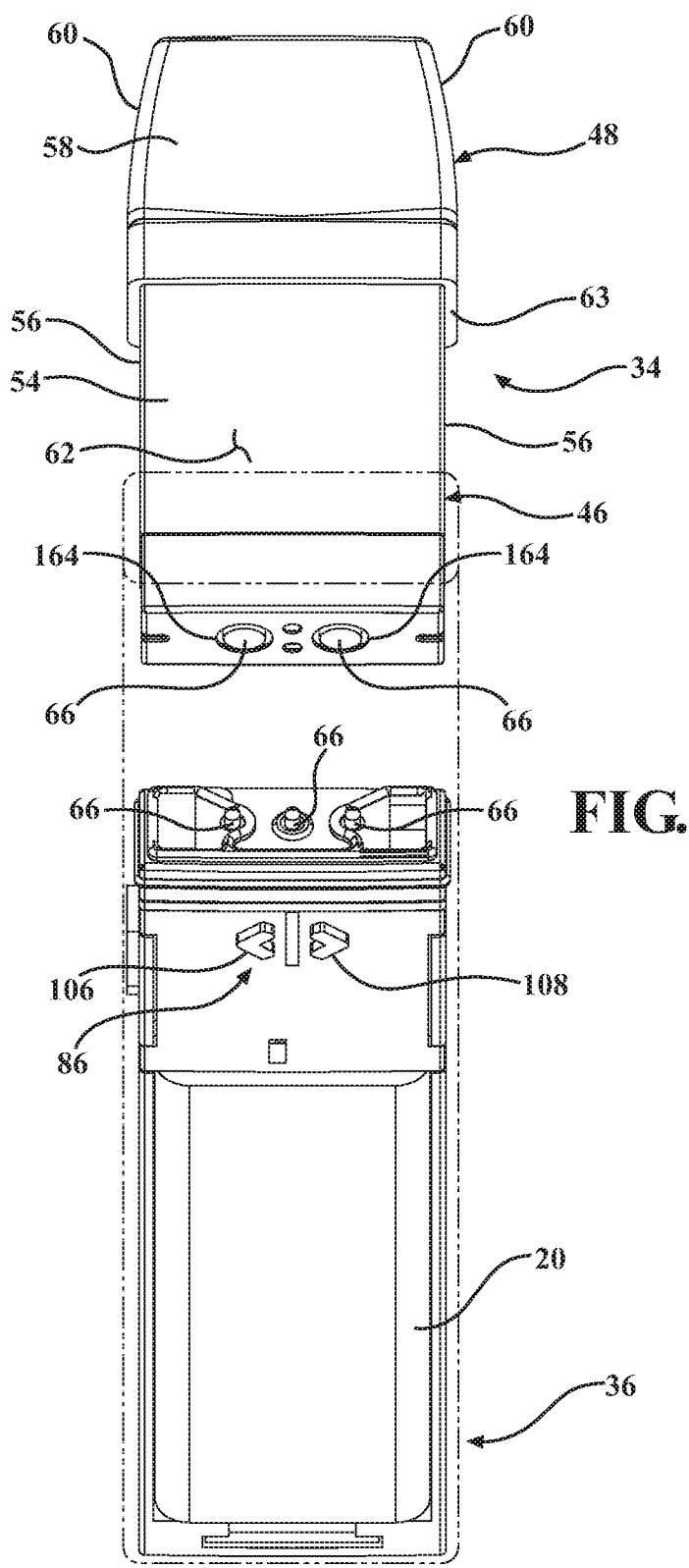
FIG. 4 are perspective views of each of the cartridge and the capital assembly angled towards the viewer to show an interface between the cartridge and the capital assembly.

FIG. 3 shows that at least a portion of the cartridge 34 is configured to be removably disposed within a cavity 64 defined by the casing 38 of the capital assembly 36. FIG. 4 further shows the connection established when the cartridge 34 is operatively coupled to the capital assembly 36. In particular, the cartridge 34 and the capital assembly 36 include complementary contacts 66 that are brought into engagement with one another to provide an electrical connection between electrical components of the capital assembly 36 and electrical components of the cartridge 34, namely the power source 20 and a main PCB assembly 74.

Figure 5:
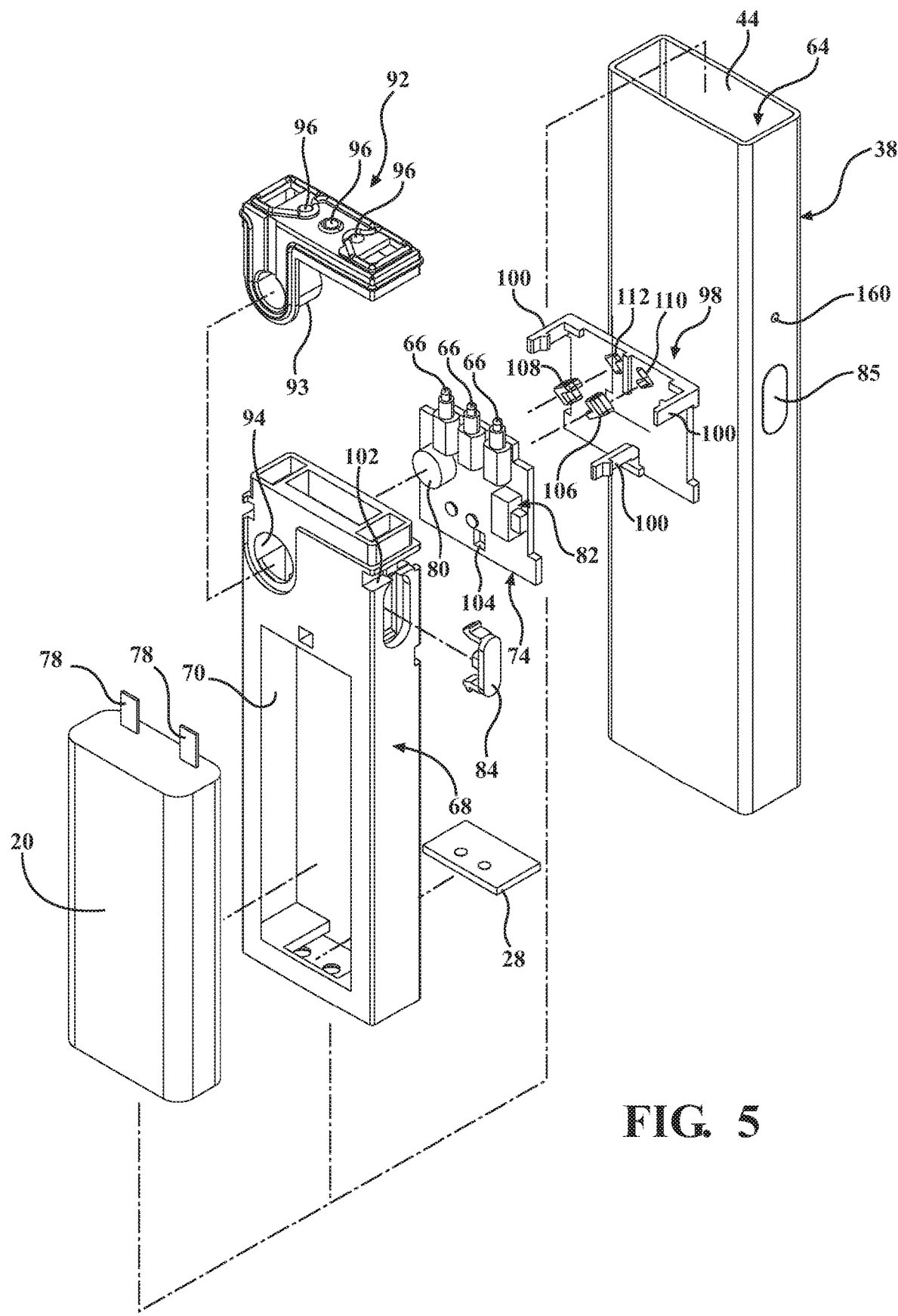
FIG. 5 is a rear exploded view of the capital assembly.
Figure 6:
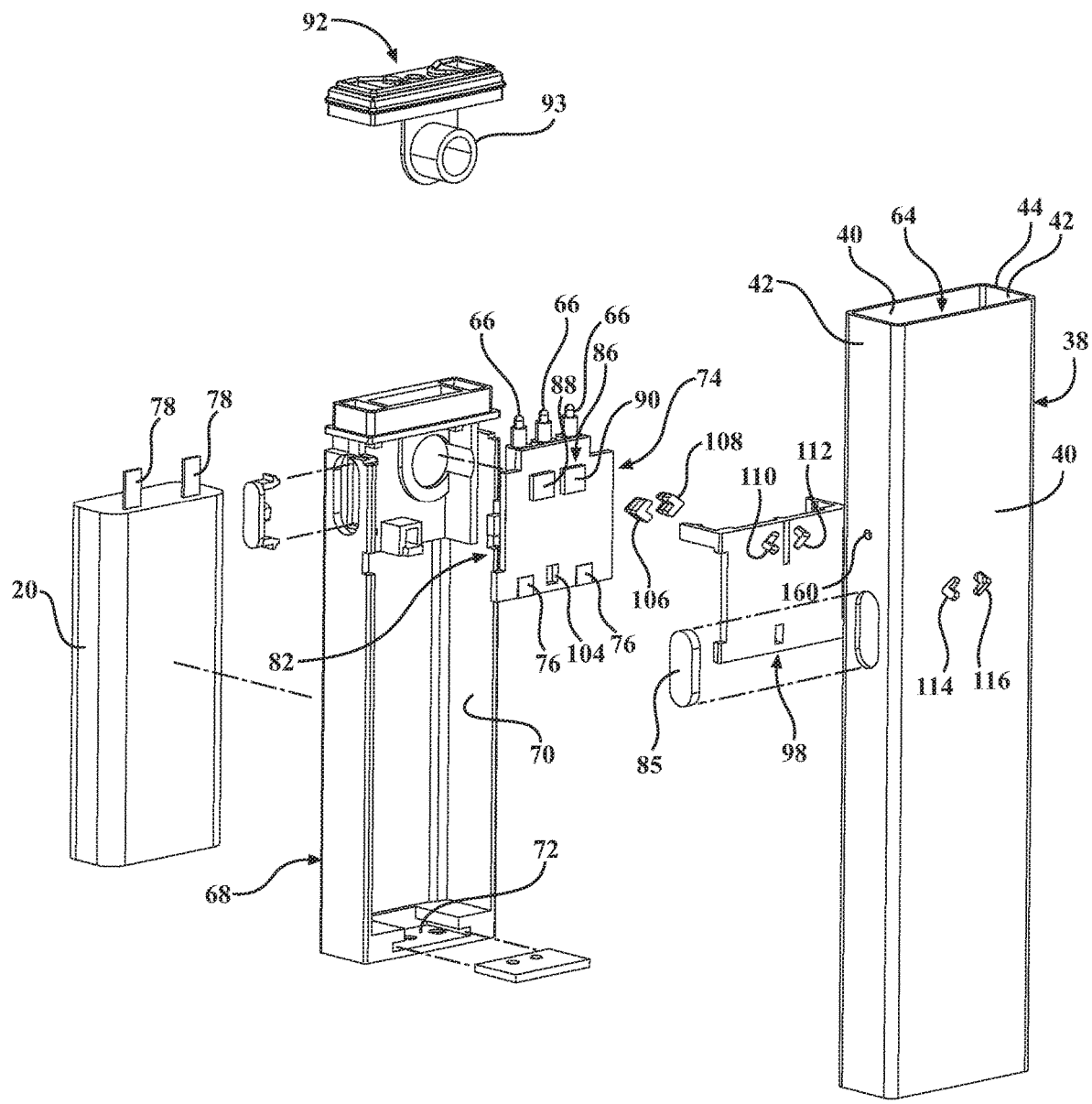
FIG. 6 is a front perspective view of the capital assembly.

Referring now to FIGS. 5 and 6, the capital assembly 36 includes a frame 68 to which the other components of the capital assembly 36 are coupled. The frame 68 defines a window 70 sized to accommodate the power source 20. The frame 68 may further define a slot 72 sized to receive the charge PCB 28. With the power source 20 disposed within the window 70 and the charge PCB 28 disposed within the slot 72, an electrical connection is established between the power source 20 and the charge PCB 28 for transferring energy to the power source 20 when the electronic smoking device 16 is coupled to the charger base 18.

The capital assembly 36 also includes the main PCB assembly 74. The main PCB assembly 74 includes contacts 76 configured to engage contacts 78 of the power source 20 and establish an electrical connection between the main PCB assembly 74 and the power source 20. The main PCB assembly 74 includes a controller 80, and a user input 82 coupled to the controller 80. The user input 82 may include a switch, as best shown in FIG. 5, for example, a momentary switch. The user input 82 is configured to receive at a first user input to place the electronic smoking device 16 in a first state, a second user input to place the electronic smoking device 16 in a second state, and a third user input to place the electronic smoking device 16 in a third state. In manners to be explained in detail, the controller 80 operates the electronic smoking device 16 based on the state of the electronic smoking device 16. A button 84 may be coupled to the frame 68 and disposed in proximity to the user input 82, and a cover 85 may be coupled to the casing 38 and disposed over the button 84. The user input 82 and/or the button 84 may be coupled to the frame 68 in a manner to provide tactile feedback to the user with each depression and/or release of the user input 82. The repeated actuation of the user input 82 may be configured to toggle between the first, second, and third states.

The main PCB assembly 74 includes an indicator assembly 86 in communication with the controller 80. As best shown in FIG. 6, the indicator assembly 86 includes a first indicator light 88 and a second indicator light 90. The first and second indicator lights 88, 90 may be arranged in a side-by-side configuration in a manner to be described. The controller 80 is further configured to operate the indicator assembly 86 to provide a first visual output in response to the user input 82 receiving the first user input, a second visual output different than the first visual output in response to the user input 82 receiving the second user input, and a third visual output different than the first and second visual outputs in response to the user input 82 receiving the third user input.

The contacts 66 of the capital assembly 36 may be coupled to or part of the main PCB assembly 74. A cap 92 may be coupled to the frame 68 to seal off the components of the capital assembly 36 when disposed in the casing 38. In particular, the cap 92 may be made of silicone for thermal resistivity, and the cap 92 may include a head 93 disposed through an aperture 94 of the frame 68 to at least partially surround the controller 80. The cap 92 may further define openings 96 through which the contacts 66 extend in a sealed manner. Further, the cap 92 may be disposed within the casing 38 in a sealed manner. As such, owing to the resilient nature of the cap 92, ingress of liquid and/or particulate through or around the cap 92 is prevented, thereby preventing the liquid and/or particulate from compromising function of the main PCB assembly 74, the indicator assembly 86, power source 20, and the like.

The capital assembly 36 includes a PCB cover 98 configured to be coupled to the frame 68. The PCB cover 98 is coupled to the frame 68 in a manner to sandwich or encapsulate the main PCB assembly 74. The PCB cover 98 includes barbs 100 extending from an inner surface of the PCB cover 98 with the barbs 100 configured to engage slots 102 of the frame 68 in an interference engagement. The main PCB assembly 74 may include a slot 104 through which the one of the barbs 100 extends to further fix the main PCB assembly 74 into position.

With continued reference to FIGS. 5 and 6, the indicator assembly 86 may include a first light pipe or lens 106 and a second light pipe or lens 108. The first lens 106 is configured to be operatively coupled to the first indicator light 88, and the second lens 108 is configured to be operatively coupled to the second indicator light 90. More particularly, the first lens 106 is configured to be positioned in abutment or adjacent to the first indicator light 88, and the second lens 108 is configured to be positioned in abutment or adjacent to the second indicator light 90. With the first and second indicator lights 88, 90 operatively coupled to the first and second lens 106, 108, respectively, light outputted from the first and second indicator lights 88, 90 is transmitted through the first and second lens 106, 108, respectively. Whereas the first and second indicator lights 88, 90 may be non-specific in shape, the first and second lens 106, 108 may be arrows or chevrons in shape.

The first lens 106 may be supported in a first aperture 110 of the PCB cover 98, and the second lens 108 may be supported in a first aperture 112 of the PCB cover 98. As shown in FIGS. 5 and 6, the first and second apertures 110, 112 may be arrows or chevrons in shape complementary to the shape of the first and second lens 106, 108. Likewise, the casing 38 may include a first aperture 114 and a second aperture 116 complementary to the first and second apertures 110, 112. In particular, one of the first sidewalls 40 of the casing 38 defines the first and second apertures 114, 116. With the frame 68 and the PCB cover 98 coupled thereto and disposed within the casing 38, the first and second apertures 114, 116 are aligned with the first and second apertures 110, 112 of the PCB cover 98, the first and second lens 106, 108, and the first and second indicator lights 88, 90. The first and second lens 106, 108 may be at least partially supported by the first and second apertures 114, 116 of the casing 38. The arrangement results in light being outputted by at least one of the first and second indicator lights 88, 90 being visible to the user viewing a front of the casing 38. The light may appear to the user as chevrons.

Figure 8:
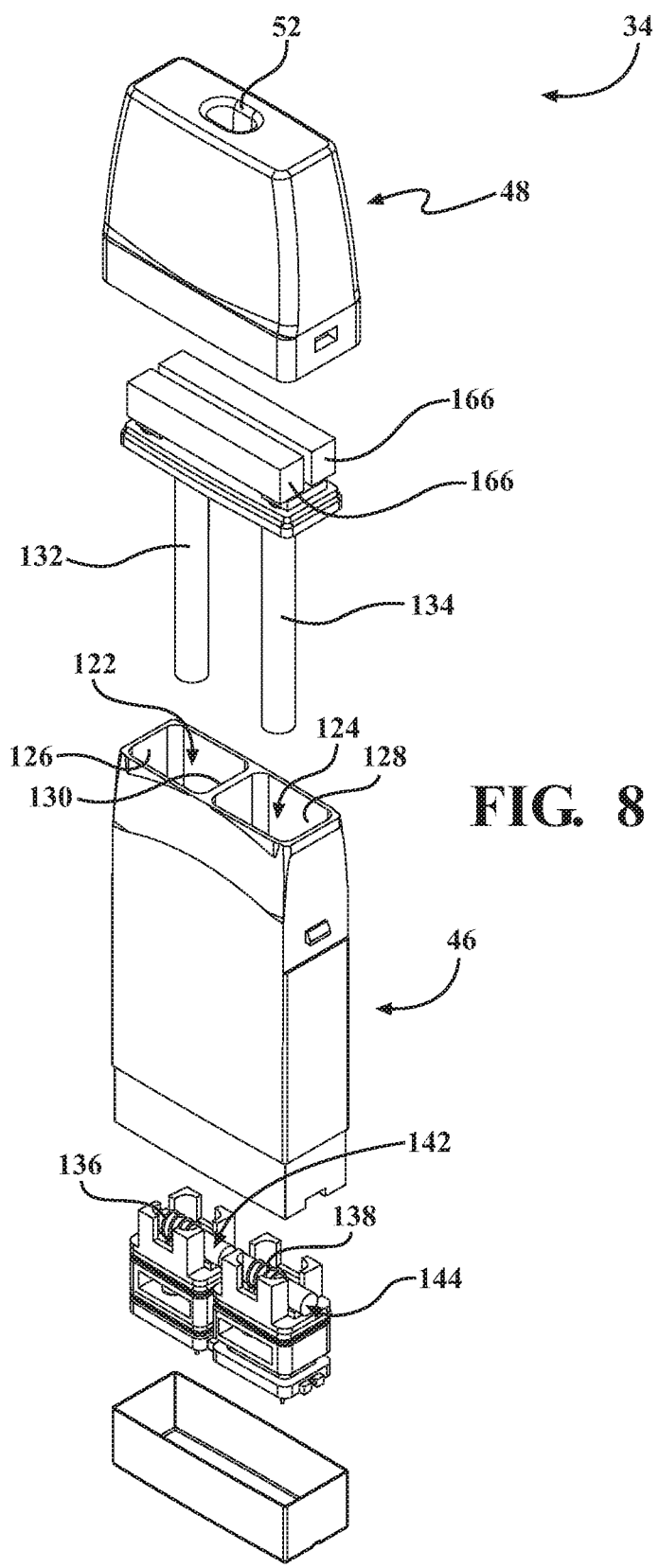
FIG. 8 is an exploded view of the cartridge.
Figure 9:
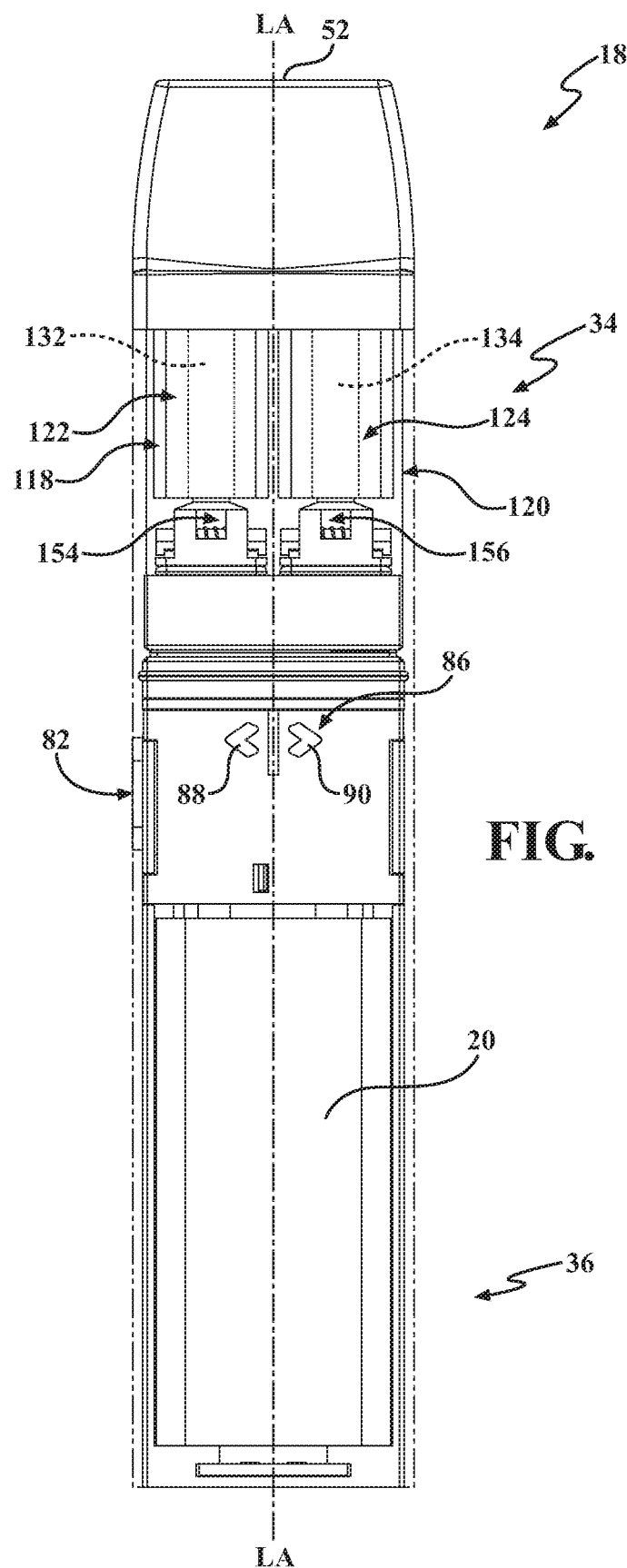
FIG. 9 is a front elevation view of the electronic smoking device with a casing shown in phantom.
Figure 10:
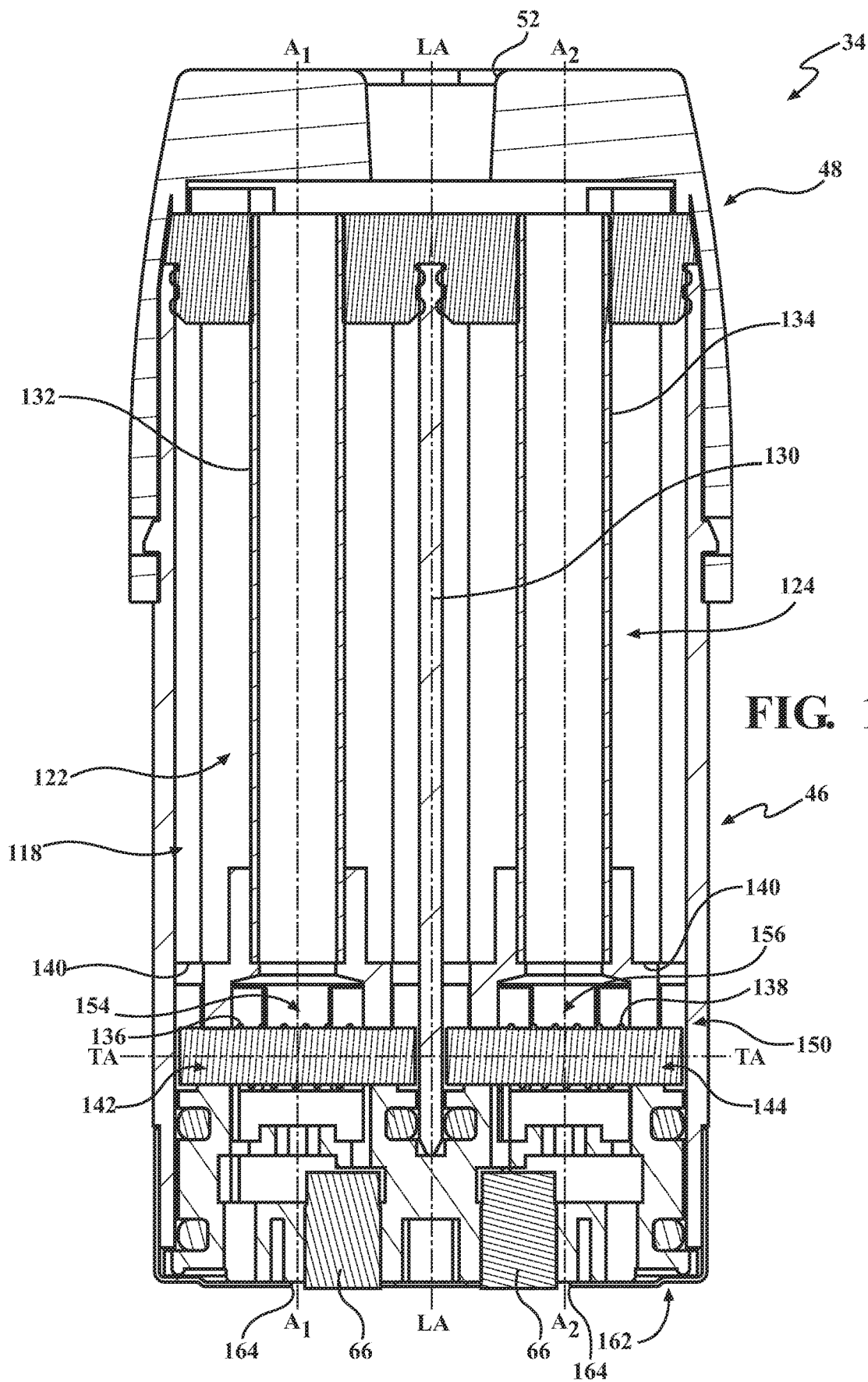
FIG. 10 is a sectional view of the cartridge of FIG. 7 taken along section lines 10-10.

Referring now to FIGS. 8-10, the cartridge 34 is shown including the housing 46 and the mouthpiece 48. The cartridge 34 includes a first atomizer 118, and a second atomizer 120 arranged in a parallel configuration with the first atomizer 118. In other words, the first and second atomizer 118, 120 may be considered arranged in a side-by-side configuration and/or mirrored about a plane extending front-to-back through the longitudinal axis. The first atomizer 118 includes a first reservoir 122 configured to store a first liquid vaporizable material, and a second reservoir 124 configured to store a first liquid vaporizable material. FIG. 10 shows the first reservoir 122 generally oriented on a first axis (A1) and the second reservoir 124 generally oriented on a second axis (A2) with the first and second axes being parallel to one another and parallel to the longitudinal axis.

The first and second reservoirs 122, 124 may be defined within portion of the housing 46. FIG. 8 best shows the housing 46 defining two square- or rectangular-shaped bores 126, 128 separated by a partition 130. The first and second bores 126, 128 may define outer surfaces of the first and second reservoirs 122, 124, respectively. The cartridge 34 may further include a first chimney 132 and a second chimney 134 coaxially disposed within the first and second bores 126, 128, respectively. The first and second chimney 132, 134 may cylindrical-shaped tubes having a diameter less than a width and thickness of the first and second bores 126, 128, respectively. The first and second chimneys 132, 134 may define inner surfaces of the first and second reservoirs 122, 124, respectively. In other words, the first and second reservoirs 122, 124 may be defined between the first and second bores 126, 128 and the first and second chimneys 132, 134.

Figure 11:
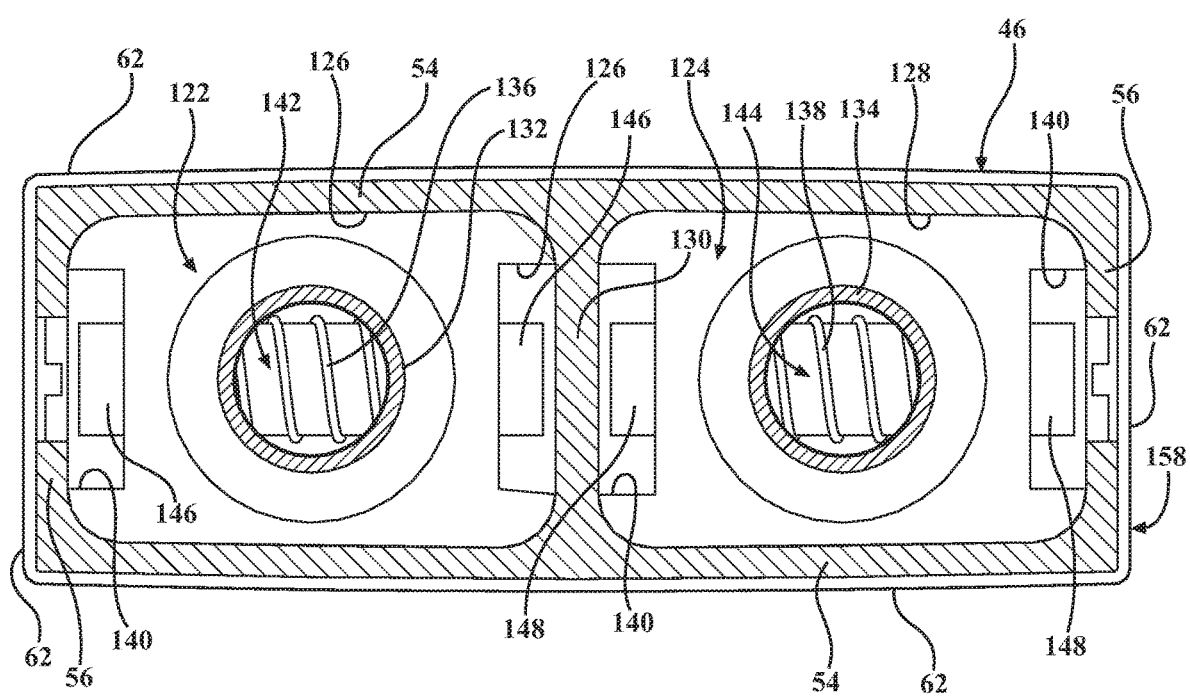
FIG. 11 is a top plan view of the cartridge of FIG. 7 taken along section lines 11-11.

The cartridge 34 includes a first heating element 136 and a second heat element 138. The first and second heating elements 136, 138 are in fluid communication with the first and second reservoirs 122, 124. With further reference to FIGS. 10 and 11, the housing 46 may define at least one aperture 140 with a lower wall to provide the fluid communication between the first and second reservoirs 122, 124 and a first wick 142 and a second wick 144, respectively, disposed beneath the lower wall. More specifically, the first wick 142 may be an elongate cylinder having opposing ends 146 oriented widthwise beneath the first reservoir 122. The opposing ends 146 are positioned beneath the apertures 140 to provide fluid communication between the first reservoir 122 and the first wick 142. Likewise, the second wick 144 may be an elongate cylinder having opposing ends 148 oriented widthwise beneath the second reservoir 124. The opposing ends 148 are positioned beneath the apertures 140 to provide fluid communication between the second reservoir 124 and the second wick 144.

Figure 12:
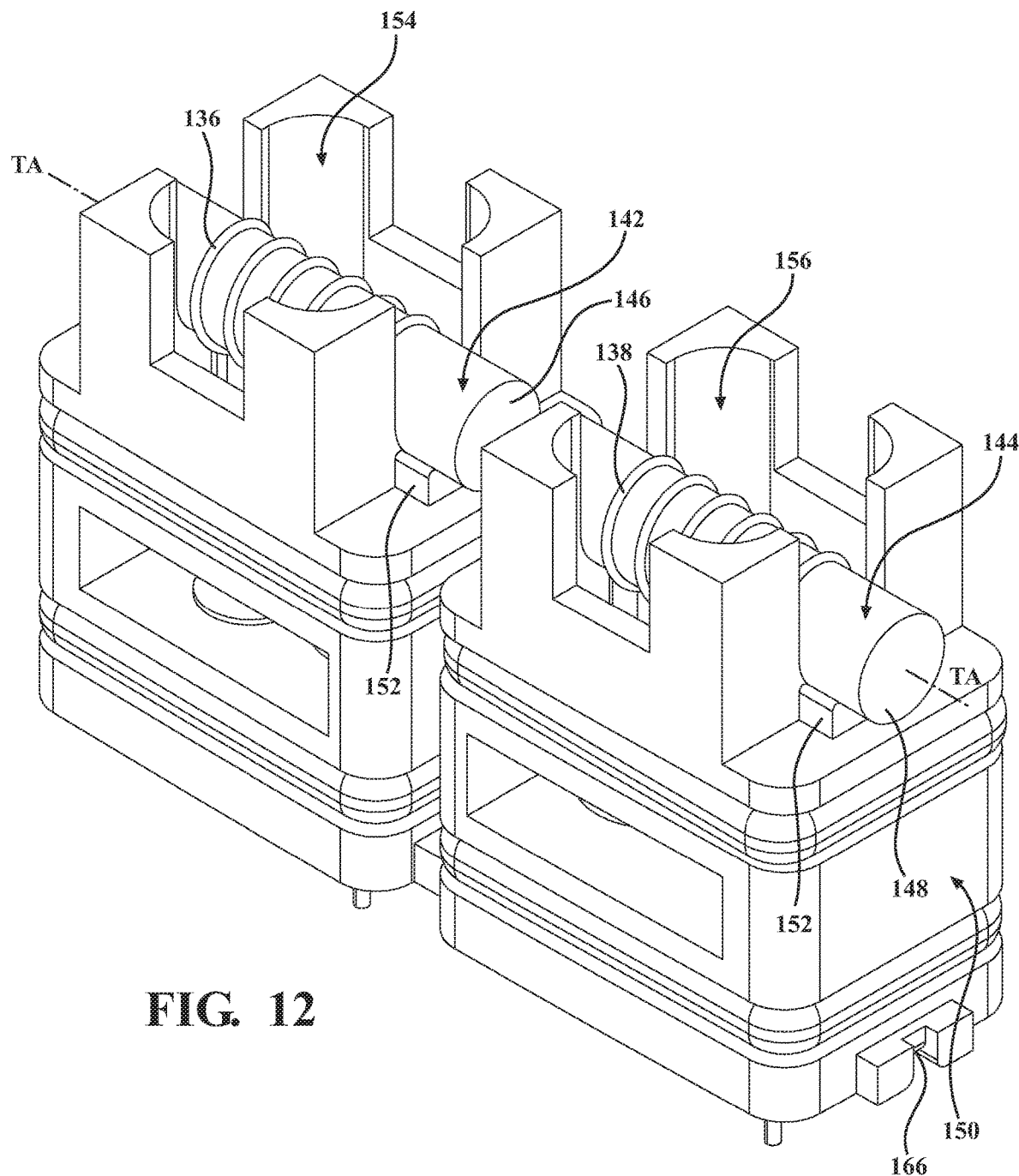
FIG. 12 is a perspective view of select componentry of a first and second atomizer.

As best shown in FIGS. 10-12, the first heating element 136 may be a resistive wire helically wrapped around the first wick 142, and the second heating element 138 may be another resistive wire helically wrapped around the second wick 144. The first and second heating elements 136, 138 are coupled to the contacts 66 that are brought into engagement with the contacts 66 of the capital assembly 36 when the cartridge 34 is removably coupled with the capital assembly 36. The first and second heating elements 136, 138 and the first and second wicks 142, 144 may be supported on a cradle assembly 150 shown in FIG. 12. The cradle assembly 150 is coupled to the housing 46, as generally reflected in FIG. 8, such that the first and second heating elements 136, 138 and the first and second wicks 142, 144 are separated by the partition 130 and positioned beneath the first and second reservoirs 122, 124, respectively. The cradle assembly 150 may include supports 152 upon which the first and second wicks 142, 144 rest. The supports 152 are arcuate and shape and cooperate with arcuate barriers (not shown) of the housing 46 to fluidly isolate first and second vaporization chambers 154, 156 from the first and second reservoirs 122, 124, respectively, while the opposing ends 146, 148 of the first and second wicks 142, 144 to be in fluid communication with the first and second reservoirs 122, 124. In other words, the first and second heating elements 136, 138 and the first and second vaporization chambers 154, 156 surrounding the first and second heating elements 136, 138 are not flooded with the first and second liquid vaporizable material stored in the first and second reservoirs 122, 124. Rather capillarity effect from the first and second wicks 142, 144 draw the first and second liquid vaporizable material near or into contact with the first and second heating elements 136, 138, after which operation of the first and second heating elements 136, 138 vaporizes the first and second liquid vaporizable material to produce the first and second vapor, respectively. FIGS. 11 and 12 show that the first and second vaporization chambers 154, 156 in fluid communication with the first and second chimneys 132, 134, respectively. After the first and second vapor is produced, the first and second vapor may be drawn through the first and second chimneys 132, 134, respectively, to the opening 52 at the proximal end 50 of the mouthpiece 48.

As previously mentioned, known electronic smoking devices that separately store more than one e-liquid fail to do so in in smaller form factor. For example, two cylindrical reservoirs disposed within an outer cylindrical or rectangular housing fail to maximize volume that may otherwise be used to increase the amounts of the e-liquids storable with the cartridge. The electronic smoking device 16 of the disclosure provides maximizes the volume of the first and second reservoirs 122, 124 of the cartridge 34. The first and second reservoirs 122, 124 are non-circular in axial section and in a parallel arrangement to one another and configured to be inserted in the rectangular-shaped opening 44 of the capital assembly 36. More particularly and with reference to FIG. 11, the first and second sidewalls 54, 56 have an outer surface 62 opposite the first and second bores 126, 128 that define an outer periphery 158 of the housing 46 that is rectangular in shape. Moreover, as mentioned, the first and second bores 126, 128 at least partially defining the first and second reservoirs 122, 124 may be square or rectangular in axial section. Thus, the square or rectangular shape of the first and second reservoirs 122, 124 within the rectangular-shaped outer periphery 158 maximizes the space within the cartridge 34. For examples, the form factor of the cartridge 34 may be reduced for specified volumes of the e-liquids, or the volume of the e-liquids may be maximized for a specified form factor of the cartridge 34.

Further realization of space efficiency is realized with the positioning and orientation of the first and second heating elements 138, 138 and the first and second wicks 142, 144. With continued reference to FIGS. 10-12, the first and second wicks 142, 144 are disposed widthwise within the cartridge 34. More particularly, the first and second wicks 142, 144 are oriented on a transverse axis TA transverse to the longitudinal axis LA of the cartridge 34 and of the electronic smoking device 16. The widthwise positioning provides for the first and second wicks 142, 144 to be relatively larger (than if positioning thickness-wise), thereby enhancing the vaporization capability of the electronic smoking device 16. Moreover, the first and second wicks 142, 144 may be collinear with one another, as best shown in FIGS. 11 and 12. Each of the first and second wicks 142, 144 may be oriented on the same axis, namely the transverse axis TA. Likewise, the first and second heating elements 136, 138 may be disposed widthwise within the cartridge 34, oriented on (i.e., coiled about) the transverse axis TA, and/or collinear with one another. Among other advantages, the aforementioned positioning of the first and second heating elements 136, 138 and the first and second wicks 142, 144 may facilitate the generally parallel arrangement of the electronic smoking device 16 in a space-efficient manner.

As previously mentioned, the first and second reservoirs 122, 124 are configured to store the first and second liquid vaporizable materials, respectively. The electronic smoking device 16 is operable to selectively vaporize the first liquid vaporizable material, the second liquid vaporizable material, and both the first and second liquid vaporizable materials (also referred to herein as the e-liquids). In one example, the first and second liquid vaporizable materials are different flavors, and depending on user preference, one of the flavors or a blend of the flavors may be provided as a vapor drawable through the opening 52 of the mouthpiece 48. The electronic smoking device 16 of the disclosure advantageously provides for an intuitive and efficient manner by which to select which one or more of the liquid vaporizable materials is to be vaporized, and/or to indicate to the user which one or more of the liquid vaporizable materials is being vaporized during operation of the electronic smoking device.

Referring to FIG. 9, the user input 82 is configured to configured to receive a first user input to place the electronic smoking device 16 in the first state, a second user input to place the electronic smoking device 16 in the second state, and a third user input to place the electronic smoking device 16 in the third state. The first state may be associated with vaporizing of the first liquid vaporizable material from the first reservoir 122, the second state may be associated with vaporizing of the second liquid vaporizable material from the second reservoir 124, and the third state may be associated with vaporizing of the first and second liquid vaporizable material from the first and second reservoirs 122, 124, respectively. The vaporization of the first and second liquid vaporizable material from the first and second reservoirs 122, 124, respectively, may be simultaneous. For example, should the user wish to have vapor of the first flavor associated with the first liquid vaporizable material in the first reservoir 122, the user may provide the first user input to the user input 82. For another example, should the user wish a blended vapor of the first and second flavors associated with the first and second liquid vaporizable materials in the first and second reservoirs 122, 124, the user may provide the third user input to the user input 82. The first, second, and third user inputs may include repeated actuation of the user input 82. In other words, the user may actuate the user input 82 a first time to place the electronic smoking device 16 in the first state, actuate the user input 82 a second time to place the electronic smoking device 16 in the second state, and actuate the user input 82 a third time to place the electronic smoking device 16 in the third state. A fourth actuation to the user input 82 may again place the electronic smoking device 16 in the first state, and so on.

Especially because of the toggling nature of the user input 82, the indicator assembly 86 advantageously provides an output based on the user input. As a result, the user can readily ascertain in which state the electronic smoking device 16 is such that, should the electronic smoking device 16 being operated, the user knows which liquid vaporizable material is to be vaporized. The controller 80 is configured to operate the indicator assembly 86 to provide a first visual output in response to the user input 82 receiving the first user input, a second visual output different than the first visual output in response to the user input 82 receiving the second user input, and a third visual output different than the first and second visual outputs in response to the user input 82 receiving the third user input. The first, second, and third visual outputs may be selective lighting of the first and second indicator lights 88, 90 to be described, however, other visual and other outputs are contemplated. For example, more than two indicator lights may be provided each associated with one of the states of the electronic smoking device 16. For another example, both the first and second indicator lights 88, 90 are illuminated in each state, but a color of the light(s) is associated with the states of the electronic smoking device 16. Still further, audible, tactile, and other feedback and indicia to the user are contemplated.

FIG. 9 shows the first and second indicator lights 88, 90 arranged in parallel arrangement complementary to the parallel arrangement of the first and second atomizers 118, 120. Further, the first and second indicator lights 88, 90 are centered between opposing sides of the capital assembly 36 and positioned on opposite sides of the longitudinal axis LA of the electronic smoking device 16, as are the first and second atomizers 118, 120. In one implementation, owing to the shape of the first and second apertures 110, 112, 114, 116 in each of the PCB cover 98 and the casing 38 (see FIG. 6), the first indicator lights 88, 90 output light shaped as chevrons oriented sideways facing towards the opposing sides of the capital assembly 36. From the positioning, alignment, shape, and nature of operation of the indicator assembly 86, it readily follows that when the first indicator light 88 is illuminated, the user can expect the first atomizer 118 to be operated with operation of the electronic smoking device 16. Likewise, when the second indicator light 90 is illuminated, the user can expect the second atomizer 120 to be operated with operation of the electronic smoking device 16. When the first and second indicator lights 88, 90 are illuminated, the user can expect the first and second atomizers 118, 120 to be operated, perhaps simultaneously, with operation of the electronic smoking device 16.

In the example using flavors, the user may actuate the user input 82 a first time, and the first indicator light 88 is illuminated. The user can expect that with operation of the electronic smoking device 16, the first flavor of e-liquid from the first reservoir 122 will be vaporized. If the user input 82 is actuated a second time, the second indicator light 90 is illuminated. The user can expect that with operation of the electronic smoking device 16, the second flavor of e-liquid from the second reservoir 124 will be vaporized. If the user input 82 is actuated a third time, the first and second indicator lights 88, 90 are illuminated. The user can expect that with operation of the electronic smoking device 16, a vapor blend of the first and second flavors of e-liquid will be produced.

One the user is satisfied with the selection as reflected by the indicator assembly 86, the user may operate the electronic smoking device 16. In one implementation, a sensor (not shown) in communication with the controller 80 may be provided to sense a draw on the mouthpiece 48 resulting in a decrease in pressure. A sensor suitable of the present application is disclosed in U.S. Pat. No. 10,231,488, issued Mar. 19, 2019, the entire contents of which are hereby incorporated by reference. In another implementation, a second user input may be actuated while the draw is performed. The controller 80 is configured to operate the power source 20 to activate the first heating element 136 with operation of the electronic smoking device 16 in the first state, activate the second heating element 138 with operation of the electronic smoking device 16 in the second state, and activate both the first and second heating elements 136, 138 with operation of the electronic smoking device 16 in the third state. In other words, based on the state of the electronic smoking device 16, as stored in memory (not shown) in communication with the controller 80, the controller 80 transmits electric power through a select one or more of the contacts 66 of the main PCB assembly 74, which are in electrical connection with the contacts 66 respectively in electrical connection with the first and second heating elements 136, 138. The electrical power being supplied to the first and/or second heating elements 136, 138 respectively heats the e-liquid(s) on surfaces of the first and/or second wicks 142, 144, thereby producing the first and/or second vapors, respectively.

The controller 80 may be further configured to control the indicator assembly 86 to illuminate the first indicator light 88 with activation of the first heating element 136, illuminate the second indicator light 90 with activation of the second heating element 138, and illuminate both of the first and second indicator lights 88, 90 with activation of both of the first and second heating elements 136, 138. Thus, while the user is operating the electronic smoking device 16, the indicator assembly 86 alerts or reminds the user to which one or more flavors of vapor to expect. The controller 80 may control the indicator assembly 86 to automatically illuminate or cease illumination with initiation or cessation of the draw on the mouthpiece 48.

In certain implementations, after cessation of the draw on the mouthpiece 48, the memory stores the state of the electronic smoking device 16. If, later, the user initiates another draw on the mouthpiece 48, the electronic smoking device 16 operates in a manner previously described based on the stored state. The arrangement prevents the need for the user to provide input(s) to the user input 82 to take another draw with the same flavor profile as the previous draw. It is contemplated that features may be included that provide for stored user profiles (for multiple users) as well as variable blend control. In certain implementations, the first and second heating elements 136, 138, when operated simultaneously, receive the same voltage and thus produce the same amount of vapor (e.g., an equal blend of the first and second flavors). In other implementations, the user may select a blend ratio that is weighted towards one of the two flavors. For example, the user may selectively tune one of the first and second heating elements 136, 138 to operate at half strength with the result being a 75%-25% blend of the first and second flavors. Other related operational parameters are contemplated and within the scope of the disclosure.

Figure 7:
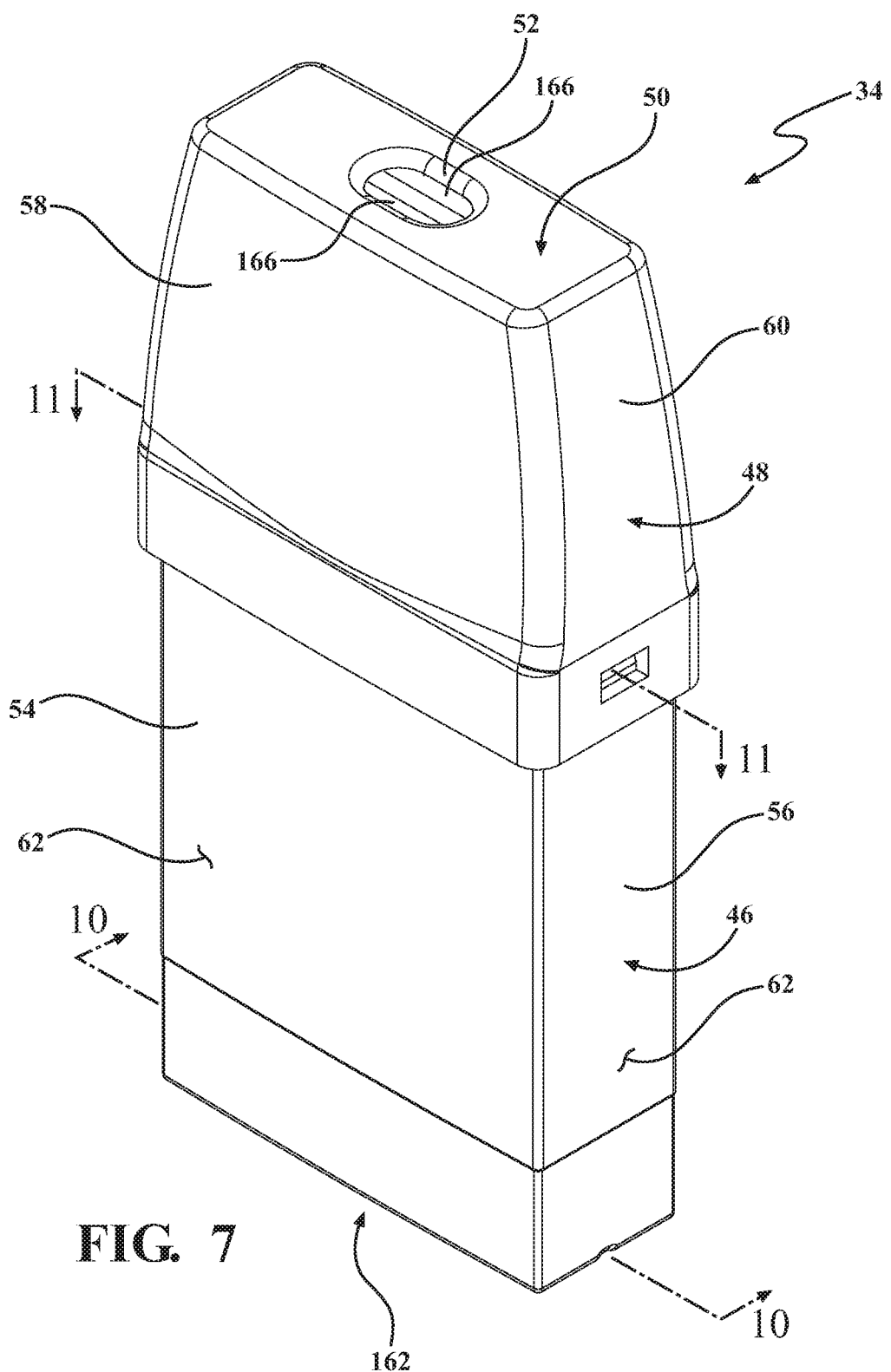
FIG. 7 is a perspective view of the cartridge.

As the user draws on the mouthpiece 48, air enters the electronic smoking device 16 through an inlet 160, as shown in FIGS. 1, 3, 5 and 6. The inlet 160 is defined by the casing 38 and at an axial position approximately between a distal end 162 of the cartridge 34 (see FIGS. 7 and 10) and the cap 92 of the capital assembly 36. The air enters through apertures 164 (see FIG. 4) and through openings associated with the cradle assembly 150. The air passes into the first and second vaporization chambers 154, 156 and across the first and second heating elements 136, 138 with at least one of the first and second heating elements 136, 138 vaporizing the e-liquid(s). The air-vapor mixture (or air) is drawn through the first and second chimneys 132, 134, and combine into a single flow path in the mouthpiece 48. The air-vapor mixture passes between sorbent 166 disposed within the mouthpiece 48, for example, two elongate members spaced apart from one another to define a gap aligned with the opening 52 along the longitudinal axis (see FIGS. 7 and 8). The sorbent 166 absorbs fluid in the air-vapor mixture. The air-vapor mixture is drawn through the opening 52 and into the user's mouth. As mentioned, the single flow path is generated in the mouthpiece 48 after vaporization of the separate e-liquids. The arrangement of combining the flavors as air-vapor mixtures produces better tasting results than combining the e-liquids into a solution then vaporizing.

Referring now to FIGS. 13-17, an implementation of the electronic smoking device 16 is shown with like numbers indicating like components, wherein terminals 168 are arranged to provide for selectively operating one or both of the first and second heating elements 136, 138. The capital assembly 36 includes the power source 20, and the main PCB assembly 74 is coupled to the power source 20. The capital assembly 36 further includes a first pin 170a, a second pin 170b, and a third pin 170c coupled to or part of the main PCB assembly 74 (previously introduced generally as contacts 66). In a manner to be further explained, the pins 170 are configured to be brought into engagement with the terminals 168 of the cartridge 34 when the cartridge 34 is removably coupled with the capital assembly 36. The controller 80 is configured to transmits electric power to and through at least two of the pins 170 to create at least one electrical pathway for selectively supplying electrical power to the first and/or second heating elements 136, 138.

Figure 13:
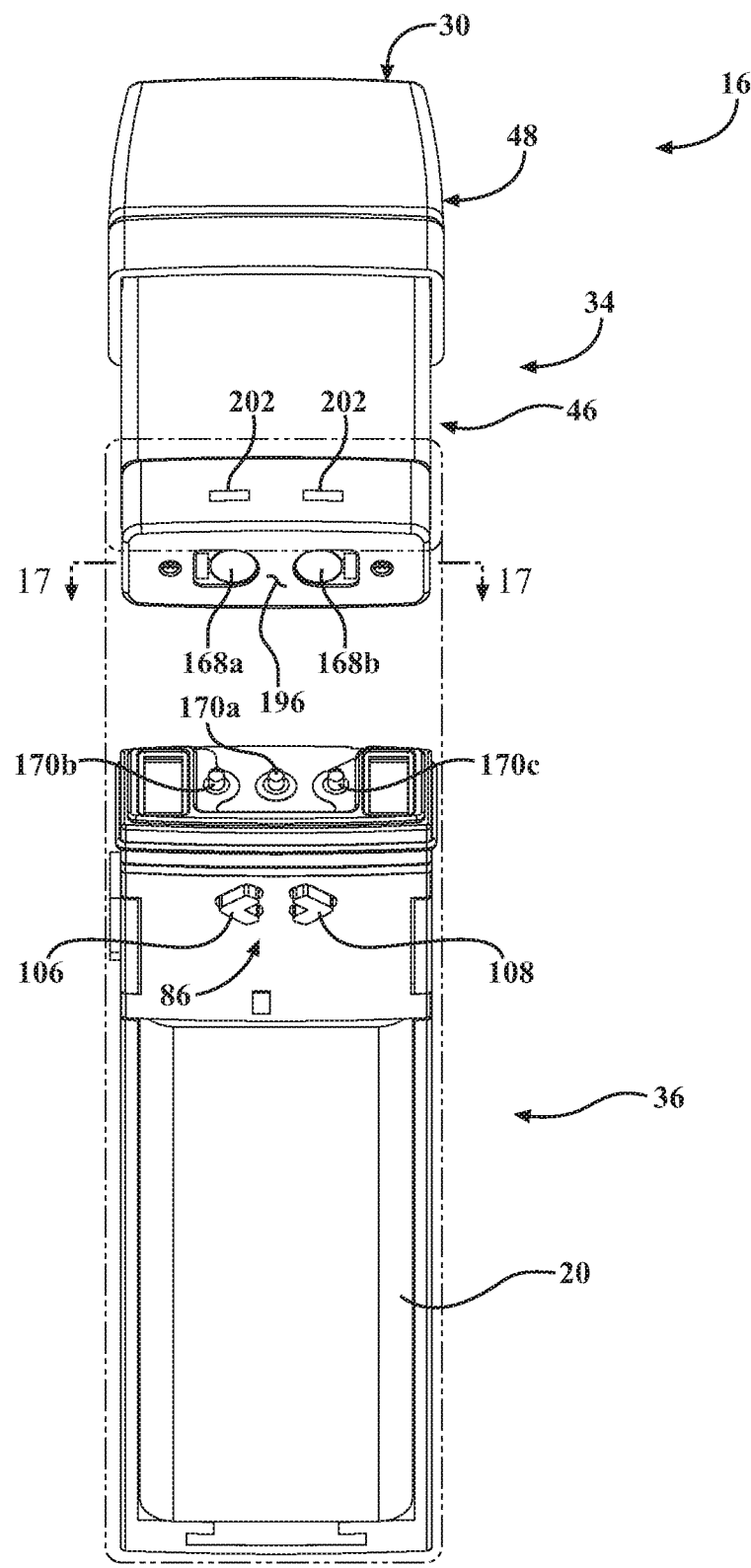
FIG. 13 are perspective views of each of a cartridge and the capital assembly angled towards the viewer to show another interface between the cartridge and the capital assembly.
Figure 14:
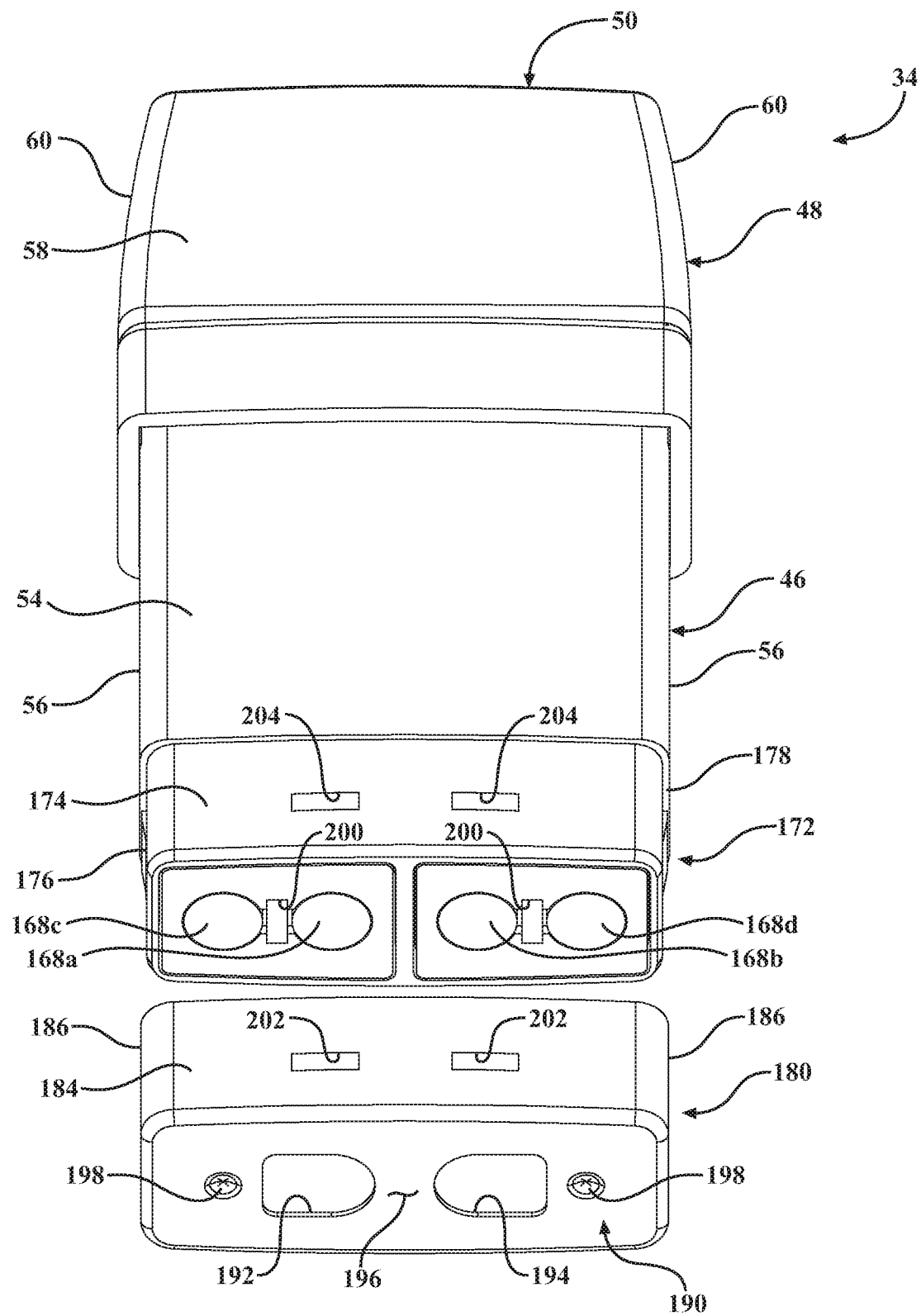
FIG. 14 is a bottom perspective view of the cartridge of FIG. 13 with a base member exploded to show terminals of the cartridge.

FIGS. 13 and 14 show the cartridge 34 including the mouthpiece 48 fixedly or removably coupled to the housing 46. The mouthpiece 48 may define the proximal end 50 of the cartridge 34, and the opening 52 to facilitate a user drawing vapor through the electronic smoking device 16 in a manner to be further described. The first sidewalls 54 and the second sidewalls 56 may define the width and the thickness of the housing 46, respectively, with the width being greater than the thickness. Further, the housing 46 may include a distal portion 172 having first sidewalls 174 and second sidewalls 176 defining a width and a thickness, respectively, that is slightly less than the aforementioned width and the thickness. The resulting arrangement may be the distal portion 172 being a stepwise taper to define a lip 178.

The cartridge 34 may include a base member 180 coupled to the housing 46. The base member 180 may generally be in the form a cap configured to be coupled to and at least partially disposed over the distal portion 172. In one example, the base member 180 includes slots 182 defined within second sidewalls 186 with the slots 182 configured to receive detents 188 disposed on the second sidewalls 176 of the distal portion 172. The interference engagement of the detents 188 within the slots 182 secure the base member 180 to the housing 46 to provide a generally contoured outer surface of the cartridge 34, as shown in FIGS. 13 and 16.

Referring to FIG. 14, the base member 180 includes first sidewalls 184 and the second sidewalls 186 defining a width and a thickness of the base member, 180, respectively, with the width being greater than the thickness. And end wall 190 is coupled to the first and second sidewalls 184, 186 and define the distal end 162 of the cartridge 34 to generally form the cap. The end wall 190 defines a first aperture 192 and a second aperture 194 separate from the first aperture 192. The first aperture 192 and the second aperture 194 are separated by a contact surface 196 to be described. In other words, the first and second terminals 168a, 168b of the cartridge 34 are positioned opposite the contact surface 196. The first aperture 192 and the second aperture 194 may be sized and positioned to receive the second pin 170b and the third pin 170c of the capital assembly 36, respectively, when the cartridge 34 is removably coupled with the capital assembly 36. The base member 180 may be formed from electrically conductive material, for example, metal.

As mentioned, the cartridge 34 includes the first terminal 168a and the second terminal 168b. The cartridge 34 may further include a third terminal 168c and a fourth terminal 168d. The first terminal 168a is positioned adjacent or within the first aperture 192, and the second terminal 168b is positioned adjacent or within the second aperture 194. As best shown in FIG. 13, the first terminal 168a is configured to be engaged by the second pin 170b of the capital assembly 36, and the second terminal 168b is configured to be engaged by the third pin 170c of the capital assembly 36. The first pin 170a may be a negative electrode, and the second and third pins 170b, 170c may be positive electrodes; however, the converse arrangement is contemplated.

Figure 15:
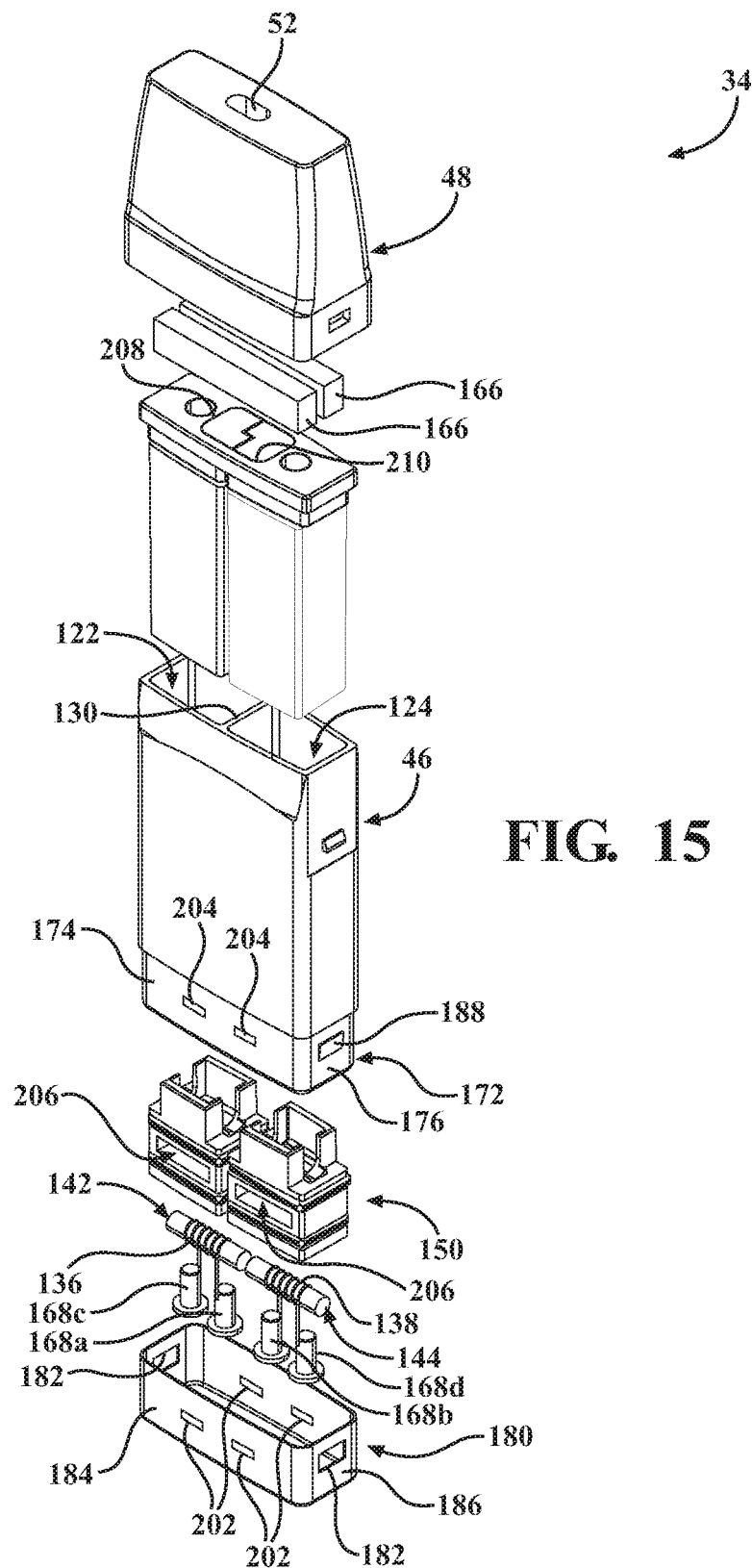
FIG. 15 is an exploded view of the cartridge of FIG. 13.
Figure 16:
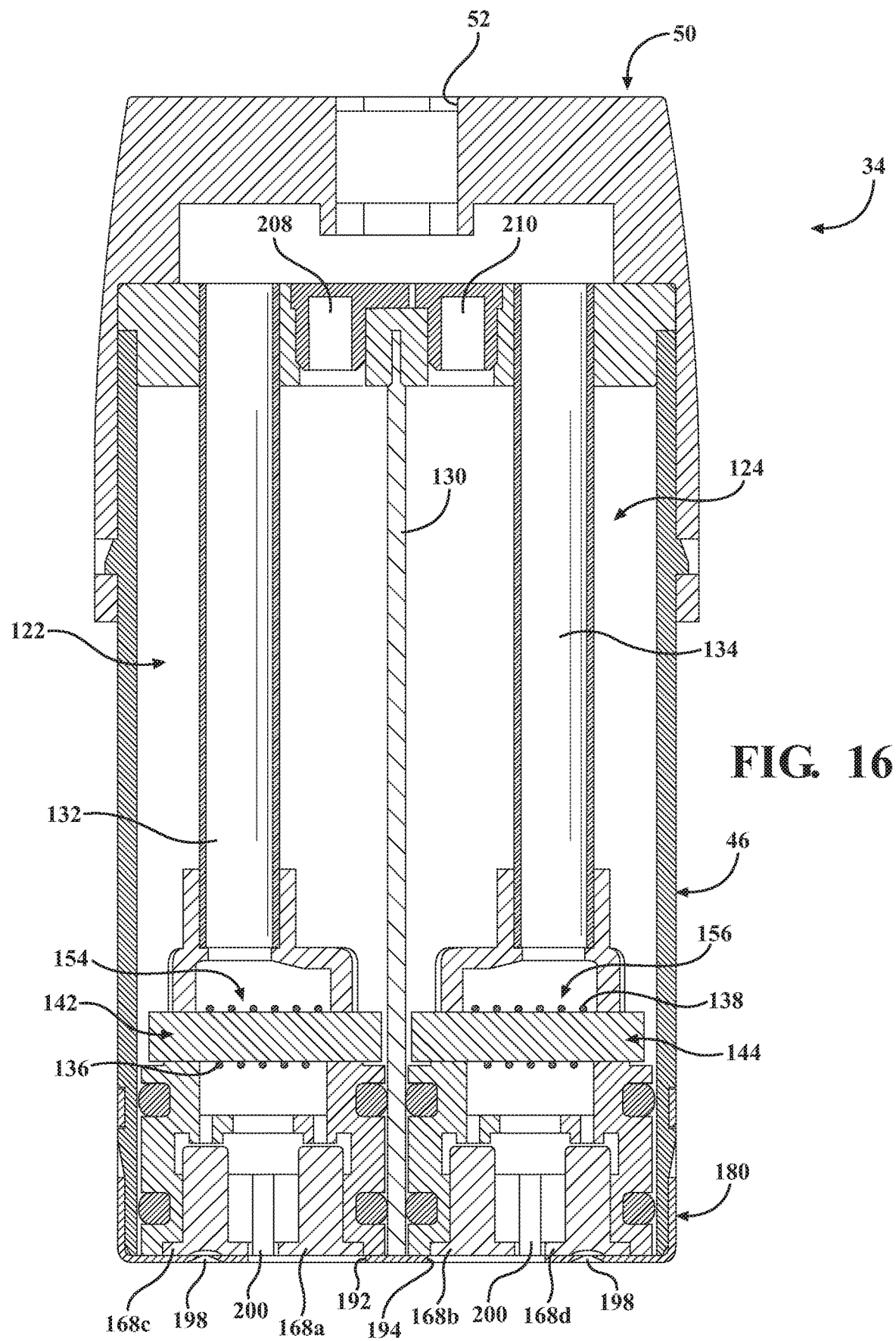
FIG. 16 is a sectional view of the cartridge of FIG. 13 taken along section lines 16-16.

With concurrent reference to FIGS. 15 and 16, the first heating element 136 includes an end coupled to the first terminal 168a and another end in electrical communication with the contact surface 196 of the base member 180. The second heating element 138 includes an end coupled to the second terminal 168b and another end in electrical communication with the contact surface 196 of the base member 180. With an end of each of the first and second heating elements 136, 138 in electrical communication with the contact surface 196 of the base member 180, the contact surface 196 is a common terminal to both the first and second heating elements 136, 138. The first and second terminals 168a, 168b are electrically insulated from the contact surface 196 of the base member 180. The electrical insulation may be from adequate spacing between the first and second terminals 168a, 168b and the base member 180, and/or from an insulator (not shown) suitably disposed about the first and second terminals 168a, 168b. The contact surface 196 is configured to be directly contacted by the first pin 170a of the capital assembly 36 when the cartridge 34 is removably coupled with the capital assembly 36. The resulting arrangement provides for two electrical pathways for selectively operating one or both of the first and second heating elements 136, 138. Through the controller 80 facilitating the power source 20 to energize the first pin 170a and the second pin 170b, a first electrical pathway includes the second pin 170b (as the positive electrode), the first terminal 168a, the first heating element 136, the contact surface 196, and the first pin 170a (as the negative electrode). Energizing the first pin 170a and the third pin 170c may provide a second electrical pathway including the third pin 170c (as the positive electrode), the second terminal 168b, the second heating element 138, the contact surface 196, and the first pin 170a (as the negative electrode). Energizing the first, second, and third pins 170a, 170b, 170c may simultaneously provide the first and second electrical pathways with the contact surface 196 being the common terminal to both the first and second heating elements 136, 138. As a result, the first heating element 136 and/or the second heating element 138 may be selectively operated to vaporize the liquid vaporizable material in the first and second reservoirs 122, 124, respectively.

In certain implementations, the third and fourth terminals 168c, 168d are in direct contact with the base member 180, and thus in electrical communication with the contact surface 196. FIGS. 14 and 16 show the base member 180 including dimples 198 extending proximally to facilitate the direct contact between the base member 180 and the third and fourth terminals 168c, 168d. The dimples 198 are positioned opposite the first and second apertures 192, 194, and thus the third and fourth terminals 168c, 168d are positioned opposite the first and second terminals 168a, 168b. As best shown in FIGS. 15 and 16, the end of the first heating 136 that is not coupled to the first terminal 168a is coupled to the third terminal 168c, and the end of the second heating element 138 that is not coupled to the second terminal 168b is coupled to the fourth terminal 168d. The third and fourth terminals 168c, 168d may facilitate providing the two electrical pathways for selectively operating one or both of the first and second heating elements 136, 138. The first electrical pathway may include the second pin 170b (as the positive electrode), the first terminal 168a, the first heating element 136, the third terminal 168c, the contact surface 196, and the first pin 170a (as the negative electrode). The second electrical pathway may include the third pin 170c (as the positive electrode), the second terminal 168b, the second heating element 138, the fourth terminal 168d, the contact surface 196, and the first pin 170a (as the negative electrode). Energizing the first, second, and third pins 170a, 170b, 170c may simultaneously provide the first and second electrical pathways as previously described. The use of the contact surface 196 of the base member 180 as a common terminal to the two electrical pathways may simply construction of the electronic smoking device 14, including the cartridge 34 and the capital assembly 36, namely the main PCB assembly 74.

The first and second terminals 168a, 168b may be a first pair of terminals configured to engage the pins 170b, 170c of the capital assembly when the cartridge is removably coupled with the capital assembly, and the third and fourth terminals 168c, 168d may be a second pair of terminals in electrical communication with the contact surface 196 of the base member 180. The first and second heating elements 136, 138 each include an end coupled to one of the first pair of terminals and one of the second pair of terminals. The first and second pairs of terminals are configured to be selectively electrically energized for selectively operating the cartridge one of plural modes. A first mode may include the first heating element 136 vaporizing the first liquid vaporizable material in the first vaporization chamber 154. A second mode may include the second heating element 138 vaporizing the second liquid vaporizable material in the second vaporization chamber 156. A third mode may include the first and second heating elements simultaneously vaporize the first and second liquid vaporizable material in the first and second vaporization chambers 154, 156, respectively.

The contact surface 196 may define the distal end 162 of the cartridge 34. In certain implementations, the first and second terminals 168a, 168b are nearly or flush with the contact surface 196 of the base member 180. FIG. 16 shows contact faces of the first and second terminals 168a, 168b being just slightly recessed within the first and second apertures 192, 194, respectively. The substantially flush arrangement of the first and second terminals 168a, 168b and the contact surface 196 advantageously provides for a confident electrical connection between the terminals 168 and the pins 170, and further simplifies construction of the terminals 168 and the cartridge 34. Moreover, the rectangular shape of the cartridge 34 is particularly well suited to accommodate the first, second, third, and fourth terminals 168a, 168b, 168c, 168d in a space-conscious manner. With reference to FIG. 17, the first sidewalls 54 define the width of the housing 46 (i.e., a distance between the first sidewalls 54), and the second sidewalls 56 define the thickness of the housing 46 (i.e., a distance between the second sidewalls 56). The width may be greater than the thickness such that, with the first and second sidewalls 54, 56 arranged generally perpendicular to one another, the housing 46 of the cartridge 34 is rectangular in section. The first, second, third, and fourth terminals 168a, 168b, 168c, 168d are arranged widthwise within the cartridge 34, for example, along the base member 180. The first, second, third, and fourth terminals 168a, 168b, 168c, 168d may be aligned with one another along the transverse axis TA transverse to the longitudinal axis LA of the cartridge 34 and of the electronic smoking device 16 (see FIG. 12).

The arrangement of the terminals 168 together with the structure of the cradle assembly 150 previously introduced (see FIG. 12) provides for improved air intake into the first and second vaporization chambers 154, 156. As previously explained, as the user draws on the mouthpiece 48, air enters the electronic smoking device 16 through an inlet 160, as shown in FIGS. 1, 3, 5 and 6. Referring now to FIGS. 13, 14, 16 and 17, the air from the inlet 160 further enters through the first and second apertures 192, 194 of the base member 180. The first and second apertures 192, 194 being eccentrically shaped to accommodate the first and second terminals 168a, 168b being circular in section, and air apertures 200 adjacent the first and second terminals 168a, 168b. FIG. 14 shows one of the air apertures 200 positioned between the first and third terminals 168a, 168c, and another one of the air apertures 200 positioned between the second and fourth terminals 168b, 168d. It is appreciated from the sectional view of FIG. 16 and the bottom plan view of FIG. 17 that the air passing through the air apertures 200 enters the first and second atomizing chambers 154, 156. The air passes across the first and second heating elements 136, 138 with at least one of the first and second heating elements 136, 138 vaporizing the e-liquid(s). The air-vapor mixture (or air) is drawn through the first and second chimneys 132, 134, and combine into a single flow path in the mouthpiece 48.

In certain implementations, each of the base member 180 and the distal portion 172 of the housing 46 include lateral apertures 202, 204 aligned to provide lateral air passageways that are orthogonal to the longitudinal axis LA for the cartridge 34. FIGS. 14 and 15 show a first pair of the lateral apertures 202 on one of the first sidewalls 184, and a second pair of the lateral apertures on the other one of the first sidewalls 184. The lateral apertures 204 of the housing 46 are similarly arranged. The flow of air entering the lateral apertures 202, 204 passes through voids 206 within the cradle assembly 150, after which it may join the flow of air from the air apertures 200 below. While four lateral apertures 202, 204 are shown, it is to be appreciated that there may be zero, one, two, three, or five or more of the apertures based on the flow of air to impart the desired air-vapor mixture upon vaporization of the e-liquid.

As mentioned, the cartridge 34 may be disposable. In certain implementations, the cartridge 34 may be configured to be refilled with e-liquid(s). Referring now to FIGS. 15 and 16, the cartridge 34 may include fluid ports 208, 210 in selective communication with the first and second reservoirs 122, 124, respectively. The fluid ports 208, 210 are configured to receive a nozzle of an e-liquid dispenser to facilitate supplying the first and second reservoirs 122, 124 with e-liquid. FIG. 15 shows covers disposed over the fluid ports 208, 210 with the covers configured to prevent egress of the e-liquid already present in the first and second reservoirs 122, 124. In one example, the covers are arranged akin to a trap door so as to permit insertion of the nozzle of the e-liquid dispenser, but otherwise biased to remain closed and seal the first and second reservoirs 122, 124.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A cartridge for an electronic smoking device that includes a capital assembly with which said cartridge is configured to be removably coupled, said cartridge comprising:

a housing comprising a first reservoir configured to store a first liquid vaporizable material, a second reservoir configured to store a second liquid vaporizable material;

a first heating element configured to vaporize the first liquid vaporizable material;

a second heating element configured to vaporize the second liquid vaporizable material;

a first terminal in electrical communication with said first heating element;

a second terminal in electrical communication with said second heating element; and a base member coupled to said housing with at least a portion of said base member being positioned between said first and second terminals, wherein said base member and one or both of said first terminal and said second terminal is configured to be electrically energized by the capital assembly to selectively heat one or both of said first heating element and said second heating element.

2. The cartridge of claim 1, wherein said base member defines a first air aperture in fluid communication with said first heating element, and a second air aperture in fluid communication with said second heating element.

3. The cartridge of claim 2, further comprising:
a third terminal in electrical communication with said first heating element; and
a fourth terminal in electrical communication with said second heating element.

4. The cartridge of claim 3, wherein said third and fourth terminals are in electrical communication with said base member.

5. The cartridge of claim 4, wherein said base member is configured to electrically energize said third terminal and said fourth terminal simultaneously.

6. The cartridge of claim 3, wherein said cartridge has a width greater than a thickness, wherein said first terminal, said second terminal, said third terminal, and fourth terminal are aligned widthwise along said base member.

7. The cartridge of claim 3, wherein said first terminal and third terminal are positioned opposite said first air aperture, and said second terminal and said further terminal are positioned opposite said second air aperture.

8. The cartridge of claim 1, wherein said base member defines a first aperture with said first terminal positioned within said first aperture, and a second aperture with said second terminal positioned within said second aperture.

9. A cartridge for an electronic smoking device that includes a capital assembly with which said cartridge is configured to be removably coupled, said cartridge comprising:

a housing comprising a first reservoir configured to store a first liquid vaporizable material, and a second reservoir configured to store a second liquid vaporizable material;

a first heating element configured to vaporize the first liquid vaporizable material a second heating element configured to vaporize the second liquid vaporizable material;

a first terminal in electrical communication with said first heating element;

a second terminal in electrical communication with said second heating element;

a third terminal in electrical communication with said first heating element;

a fourth terminal in electrical communication with said second heating element;

said housing defining a first air aperture in fluid communication with said first heating element and positioned between said first terminal and said third terminal; and said housing defining a second air aperture in fluid communication with said second heating element and positioned between said second terminal and said fourth terminal.

10. The cartridge of claim 9, further comprising a base member coupled to said housing and defining a first aperture in fluid communication with said first air aperture, and a second aperture in fluid communication with said second air aperture.

11. The cartridge of claim 10, wherein at least a portion of said base member positioned between said first terminal and said second terminal is formed from electrically conductive materials and configured to be electrically energized by the capital assembly.

12. The cartridge of claim 10, wherein said third and fourth terminals are in electrical communication with said base member.

13. The cartridge of claim 10, wherein said cartridge has a width greater than a thickness, wherein said cartridge has a width greater than a thickness, wherein said first terminal, said second terminal, said third terminal, and fourth terminal are aligned widthwise along said base member.

14. The cartridge of claim 10, wherein said base member and one or both of said first terminal and said second terminal is configured to be electrically energized by the capital assembly to selectively heat one or both of said first heating element and said second heating element.

15. The cartridge of claim 10, wherein said base member is configured to electrically energize said third terminal and said fourth terminal simultaneously.

16. A cartridge for an electronic smoking device that includes a capital assembly with which said cartridge is configured to be removably coupled, said cartridge comprising:

a housing comprising a first reservoir configured to store a first liquid vaporizable material, and a second reservoir configured to store a second liquid vaporizable material;

a first heating element configured to vaporize the first liquid vaporizable material;

a second heating element configured to vaporize the second liquid vaporizable material; and a base member coupled to said housing and defining a first air aperture in fluid communication with said first heating element, and a second air aperture in fluid communication with said second heating element, wherein at least a portion of said base member between said first air aperture and said second air aperture is configured to electrically engage a pin of the capital assembly.

17. The cartridge of claim 16, wherein said base member is configured to be electrically energized by the capital assembly to selectively heat one or both of said first heating element and said second heating element.

18. The cartridge of claim 16, wherein said base member defines a first aperture and a second aperture, said cartridge further comprising:

a first terminal positioned within said first aperture and in electrical communication with said first heating element; and a second terminal positioned within said second aperture and in electrical communication with said second heating element.

19. The cartridge of claim 18, wherein said cartridge has a width greater than a thickness, wherein said first terminal and second terminal are aligned widthwise along said base member.

20. The cartridge of claim 19, further comprising:

a third terminal in electrical communication with said base member and said first heating element; and a fourth terminal in electrical communication with said base member and said second heating element.

* * * * *